(12) United States Patent
Kolinsky et al.

(10) Patent No.: US 9,400,491 B2
(45) Date of Patent: Jul. 26, 2016

(54) STABILIZED DETEMINISTIC OPTIMIZATION BASED CONTROL SYSTEM AND METHOD

(71) Applicant: ROCKWELL AUTOMATION TECHNOLOGIES, INC., Mayfield Heights, OH (US)

(72) Inventors: Jan Kolinsky, Prague (CZ); Jiri Hanzlik, Prague (CZ); Petr Horacek, Prague (CZ); Bijan Sayyarrodsari, Austin, TX (US)

(73) Assignee: Rockwell Automation Technologies, Inc., Milwaukee, WI (US)

( * ) Notice: Subject to any disclaimer, the term of this patent is extended or adjusted under 35 U.S.C. 154(b) by 526 days.

(21) Appl. No.: 13/837,297

(22) Filed: Mar. 15, 2013

(65) Prior Publication Data

US 2014/0277600 A1    Sep. 18, 2014

(51) Int. Cl.
*G05B 13/02* (2006.01)
*G05B 13/04* (2006.01)
*G05B 5/01* (2006.01)

(52) U.S. Cl.
CPC ........ *G05B 13/04* (2013.01); *G05B 5/01* (2013.01); *G05B 13/042* (2013.01)

(58) Field of Classification Search
CPC ........................................... G05B 13/04
USPC ........................................... 700/29
See application file for complete search history.

(56) References Cited

U.S. PATENT DOCUMENTS

| | | | |
|---|---|---|---|
| 6,381,504 B1 | 4/2002 | Havener et al. | |
| 7,050,863 B2 | 5/2006 | Mehta et al. | |
| 7,376,472 B2 | 5/2008 | Wojsznis et al. | |
| 7,987,145 B2 | 7/2011 | Baramov | |
| 2003/0220772 A1* | 11/2003 | Chiang et al. | ........... 703/2 |
| 2004/0049295 A1 | 3/2004 | Blevins et al. | |
| 2006/0111881 A1 | 5/2006 | Jackson | |

(Continued)

FOREIGN PATENT DOCUMENTS

| | | |
|---|---|---|
| CN | 101082811 A | 12/2007 |
| CN | 101714175 A | 5/2010 |

(Continued)

OTHER PUBLICATIONS

Gill et al. "A Schur-Complement Method Fo Sparse Quadratic Programming", 1987.*

(Continued)

*Primary Examiner* — Mohammad Ali
*Assistant Examiner* — Yuhui R Pan
(74) *Attorney, Agent, or Firm* — Fletcher Yoder, P.C.

(57) ABSTRACT

The embodiments described herein include one embodiment that provides a control method, including determining a first stabilizing feasible control trajectory of a plurality of variables of a controlled process, determining a second stabilizing feasible control trajectory for the plurality of variables for a second time step subsequent to the first time step, determining a first cost of applying the first feasible control trajectory at the second time step, determining a second cost of applying the second feasible control trajectory at the second time step, comparing the first and second costs, selecting the first feasible control trajectory or the second feasible control trajectory based upon the comparison in a predetermined time frame, and controlling the controlled process by application of the selected control trajectory.

20 Claims, 10 Drawing Sheets

(56) References Cited

U.S. PATENT DOCUMENTS

| | | | |
|---|---|---|---|
| 2006/0282177 | A1 | 12/2006 | Fuller et al. |
| 2007/0156259 | A1 | 7/2007 | Baramov et al. |
| 2009/0150890 | A1* | 6/2009 | Yourst .......................... 718/102 |
| 2009/0240480 | A1* | 9/2009 | Baramov .......................... 703/6 |
| 2009/0319059 | A1 | 12/2009 | Renfro et al. |
| 2010/0100248 | A1 | 4/2010 | Minto et al. |

FOREIGN PATENT DOCUMENTS

| | | |
|---|---|---|
| CN | 101763083 A | 6/2010 |
| EP | 1426840 A1 | 6/2004 |
| EP | 2320283 A1 | 5/2011 |
| WO | 2011160201 A1 | 12/2011 |

OTHER PUBLICATIONS

Bemporad, et al.; Ultra-Fast Stabilizing Model Predictive Control via Canonical Piecewise Affine Approximations. IEEE, 2011.

Rossiter; Model-Based Predictive Control: A Practical Approach. CRC Press, 2003.

Goldfarb, et al.; A Numerically Stable Dual Method for Solving Strictly Convex Quadratic Programs. Mathematical Programming 27, North-Holland, 1983, pp. 1-33.

Goldfarb; Efficient Primal Algorithms for Strictly Convex Quadratic Programs. Lecture Notes in Mathematics 1230, Springer-Verlag, Berlin, 1986, pp. 11-25.

Wills, et al.; Fast Linear Model Predictive Control via Custom Integrated Circuit Architecture. IEEE Transactions on Control Systems Technology, vol. 20, No. 1, 2012, pp. 50-71.

Wang, et al.; Fast Model Predictive Control Using Online Optimization. IEEE Transactions on Control Systems Technology, vol. 18, Issue 2, 2010, pp. 267-278.

Rawlings, et al.; Model Predictive Control: Theory and Design, Nob Hill Publishing, 2009.

Gill, et al.; Numerically Stable Methods for Quadratic Programming, Mathematical Programming 14, (1978).

Gill, et al.; A weighted Gram-Schmidt method for convex quadratic programming. Mathematical Programming vol. 30 No. 2, (1984).

Bartlett, et al.; QPSchur: A dual, active-set, Schur-complement method for large-scale and structured convex quadratic programming. Optim. Eng. 7, (2006).

Gill, et al.; A Schur compiement method for sparse quadratic programming. In: Reliable Numerical Computation, Oxford University Press, pp. 113-138, (1990).

Anda; Fast Plane Rotation Algorithms, Phd Thesis, University of Minnesota (1995).

González, et al.; A stable model predictive control with zone control. J. Proc. Cont. 19 (2009) 110-122.

Rawlings, et al.; Unreachable Setpoints in Model Predictive Control. IEEE Transactions on Automatic Control, vol. 53, Issue 9, 2008, pp. 2209-2215.

Daniel Axehill: "Applications of Integer Quadratic Programming in Control and Communication", Linkoping Studies in Science and Technology Thesis No. 1218, Jan. 1, 2005 (pp. 1-130), URL:http://liu.diva-portal.org/smash/get/diva2:21239/FULTEXT01 [retried on Nov. 20, 2012], pp. 9-32.

Extended European Search Report from EP14160228.4 dated Jul. 9, 2014.

Extended European Search Report from EP14160227.6 dated Jul. 16, 2014.

Extended European Search Report from EP14160334.0 dated May 30, 2014.

Chinese Office Action for CN Application No. 201410099092.3 Mailed Apr. 6, 2016; 8 Pages.

* cited by examiner

STABILIZED DETERMINISTIC OPTIMIZATION BASED CONTROL SYSTEM AND METHOD

BACKGROUND

The invention relates generally to control systems and more particularly to deterministic optimization based control of systems.

Generally, control system, such as an industrial plant or a power generation system, may be dynamic and include various constraints. For example, the constraints on the control system may be the result of actuator limits, operational constraints, economical restrictions, and/or safety restrictions. Accordingly, control of such a multivariable constrained dynamic system may be complex. Techniques such as coupled multi-loop proportional-integral-derivative (PID) controllers may not be best suited for handling the control of such complex control systems. On the other hand, one process control technique capable of handling the multivariable constraints is optimization based control (OBC). Specifically, OBC may improve the performance of the control system by enabling the system to operate closer to the various constraints (i.e., via dynamic optimization).

However, OBC may be computationally demanding because the dynamic optimization calculation may involve solving a constrained optimization problem such as quadratic programming (QP) problems at each sampling time. Utilizing a general solver may take seconds or even minutes. In addition, it may be difficult to predict the time it takes for the optimizer to solve the constrained optimization problems. Accordingly, to utilize OBC to control systems with faster dynamics, it may often be beneficial to enable deterministic OBC to provide a feasible control action within a predetermined control time.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment provides a control method including determining a first stabilizing feasible control trajectory of a plurality of variables of a controlled process, the first control trajectory being the same as or an extension of a control trajectory applied for a first time step, the trajectory extending over a plurality of future time steps after the first time step, determining a second stabilizing feasible control trajectory for the plurality of variables for a second time step subsequent to the first time step, determining a first cost of applying the first feasible control trajectory at the second time step, determining a second cost of applying the second feasible control trajectory at the second time step, comparing the first and second costs, selecting the first feasible control trajectory or the second feasible control trajectory based upon the comparison in a predetermined time frame, and controlling the controlled process by application of the selected control trajectory.

A second embodiment provides a control method, comprising a first stabilizing feasible control trajectory of a plurality of variables of a controlled process for a second time step within a predetermined time frame based upon a control trajectory applied for a first time step previous to the second time step, the trajectory extending over a plurality of future time steps after the first time step, applying an optimization-based control algorithm to determine a second feasible control trajectory for a second time step, selecting the first feasible control trajectory if a first cost of applying the first feasible control trajectory is less then a second cost of applying the second feasible control trajectory, or if the optimization-based control algorithm does not determine a second feasible control trajectory in a time allowed, and controlling the controlled process by application of the selected control trajectory.

A third embodiment provides a control system, including memory circuitry for storing executable code, and processing circuitry for executing the code. The code defining steps that, when executed determines a first stabilizing feasible control trajectory of a plurality of variables of a controlled process, the first control trajectory being the same as or an extension of a control trajectory applied for a first time step, the trajectory extending over a plurality of future time steps after the first time step, determines a second feasible control trajectory for the plurality of variables for a second time step subsequent to the first time step, determines a first cost of applying the first feasible control trajectory at the second time step, determines a second cost of applying the second feasible control trajectory at the second time step, compares the first and second costs, selects the first feasible control trajectory or the second feasible control trajectory based upon the comparison within a predetermined time frame, and controls the controlled process by application of the selected control trajectory.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
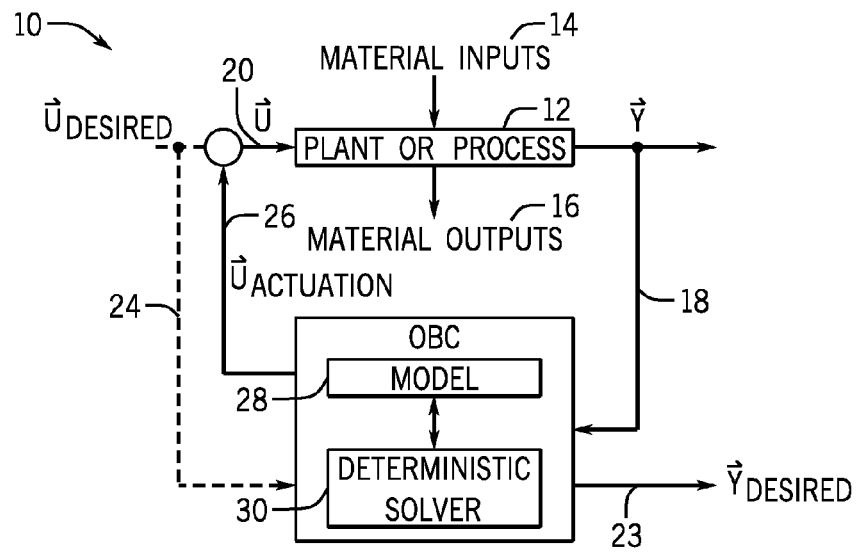
FIG. 1 depicts a block diagram of an embodiment of a control system utilizing deterministic optimization-based control (OBC)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward systems and methods for deterministic optimization-based control (OBC) of a control system, such as an industrial plant, a power generation system, or the like. Generally, control systems may utilize process control techniques to control the system. For example, some control systems utilize proportional-integral-derivative (PID) controllers coupled in a multi-loop configuration. Multi-loop PID controllers may offer a fast real-time control of a control system. In addition, PID controllers may run on embedded systems with less computational power. However, when control system has complex dynamics and/or its operation is constrained, the complexity of the process control may greatly increase and multi-loop PID controllers may not provide adequate control. For example, the control system may include processes with large dead times or non-minimum phase dynamics.

One process control technique for control of dynamic multivariable systems is optimization-based control (OBC), which can offer better control (e.g. reduces process variations to enable operation closer to constraints at more profitable operating points). Specifically, OBC uses a process model to predict future process output trajectories based on process input trajectories. In other words, OBC computes trajectories of manipulated variables to optimize the objective function (i.e., minimize costs). As used herein, the cost includes the determination of how well the output trajectories match the desired setpoints. It should be appreciated that in linear control systems, the cost may be captured as a quadratic programming (QP) problem. Accordingly, the dynamic optimization included in the OBC may be computationally complex and run on computer servers with general solvers, which may take seconds or even minutes to produce a solution. Thus, to include OBC on an embedded system for real-time process control, it may be beneficial to improve the efficiency of OBC while ensuring that it is stabilizing.

Accordingly, one embodiment provides a control method including determining a linear approximation of a pre-determined non-linear model of a process to be controlled, determining a convex approximation of the nonlinear constraint set, determining an initial stabilizing feasible control trajectory for a plurality of sample periods of a control trajectory, executing an optimization-based control algorithm to improve the initial stabilizing feasible control trajectory for a plurality of sample periods of a control trajectory, and controlling the controlled process by application of the feasible control trajectory within a predetermined time window. In other words, deterministic OBC may be utilized for real-time control of systems with fast dynamics by including a stabilization function to produce a stable feasible solution (i.e., a solution that does not increase the cost function) available for each predetermined sampling time.

By way of introduction, FIG. 1 depicts an embodiment of a control system 10 for a plant/process 12. Generally, the control system 10 may control the functioning of the plant/process 12, which may be an industrial manufacturing system, an automation system, a power generation system, a turbine system, or the like. Accordingly, as depicted, the control system 10 may control the plant/process 12 to transform material inputs 14 into material outputs 16. For example, the plant/process 12 may be a sugar crystallization process that transforms sugar syrup (i.e., material input 14) into sugar crystals (i.e., material output 16). In addition, the control system 10 may control the output variables (i.e., controlled variables) 18 by manipulating the input variables 20 (i.e., manipulated and disturbance variables). Going back to the sugar crystallization example, the control system 10 may manipulate a steam valve (i.e., manipulated variable) to control a temperature (i.e., controlled variable). In some embodiments, the material input can be a manipulated variable as well (for example a controller can control the feed rate for a material input to the plant).

To optimize the control of the plant/process 12, the control system 10 may further include optimization based control (OBC) 22 configured to find a stabilizing feasible solution for an optimization problem within a predetermined time window. In other words, the OBC 22 may determine feasible actions (i.e., solution) for the control system 10 to take. Specifically, the OBC 22 may be configured to determine a control trajectory 26 (i.e., a set of actions) over a control horizon (i.e., period of time to take the actions). Accordingly, the OBC 22 may sample the state of the plant/process 12 at specified sampling times. In some embodiments, the state of the plant/process 12 may include the previous output variables 18, a desired output trajectory 23, a desired control trajectory 24, or any combination thereof. Based on the sampled state of the plant/process 12, the OBC 22 may determine the control trajectory 26 (i.e., a feasible solution to the optimization problem) during the control time. As used herein, control time refers to the time during which the plant/process 12 is functioning, which may be in real-time. After the control trajectory 26 is determined by the OBC 22, in some embodiments, the control trajectory 26 is compared to the desired control trajectory 24 in a comparator 32 to determine the input variables 20 to the plant/process 12 (i.e., actions to be taken in the control system 10). Alternatively, the control trajectory 26 may be directly reflected in the input variables 20. It should be appreciated that the OBC 22 may be implemented on an embedded system, such as ControlLogix, available from available from Rockwell Automation, of Milwaukee, Wis.

To facilitate determining the control trajectory 26, as depicted, the OBC 22 includes a pre-determined model 28 and a deterministic solver 30. Specifically, the deterministic solver 30 may use a feasible search strategy, such as a primal active set method, to determine solutions to the constrained optimization problem. As will be described in more detail below, a feasible search strategy begins at a starting point within the feasible region of the control system 10 and moves around the feasible region to search for an optimum feasible solution (i.e., control trajectory with minimum cost). In other words, the deterministic solver 30 may determine various feasible actions (i.e., control trajectories) that may be taken by the control system 10. Based on the feasible solutions determined by the deterministic solver 30, the model 28 may be utilized to predict the behavior of the process/plant 12. In linear systems or non-linear systems with a linear approximation, the model 28 may be a linear model such as a state space model, a step or impulse response model, an autoregressive with exogenous terms (ARX) model, a transfer function model, or the like. As such, the OBC 22 may compare the cost of each feasible solution and select the control trajectory 26 with the lowest cost.

Ideally, the control trajectory 26 determined is the optimum solution with the lowest cost associated, but, as described above, the optimization calculation may be complex. Accordingly, as will be described in further detail below in the Detailed Example section, the techniques described herein aim to increase the efficiency of the dynamic optimization calculation. For example, the techniques described herein may modify an objective (i.e., cost) function to define the control system 10 constraints with simple bounds. Thus, the dynamic optimization computation may be greatly reduced and executed on an embedded system because many dynamic optimization solvers (e.g., quadratic-programming (QP) solvers) more efficiently handle simple bounds compared to complex constraints.

Although the dynamic optimization may be efficiently configured, the OBC 22 may not always find the optimum (i.e., lowest cost) control trajectory 26 during each control time. However, in practice, a stable sub-optimal control trajectory 26 may be sufficient. As used herein, the control trajectory 26 is stabilizing when the cost does not increase compared to the previous step by taking the actions.

Figure 2:
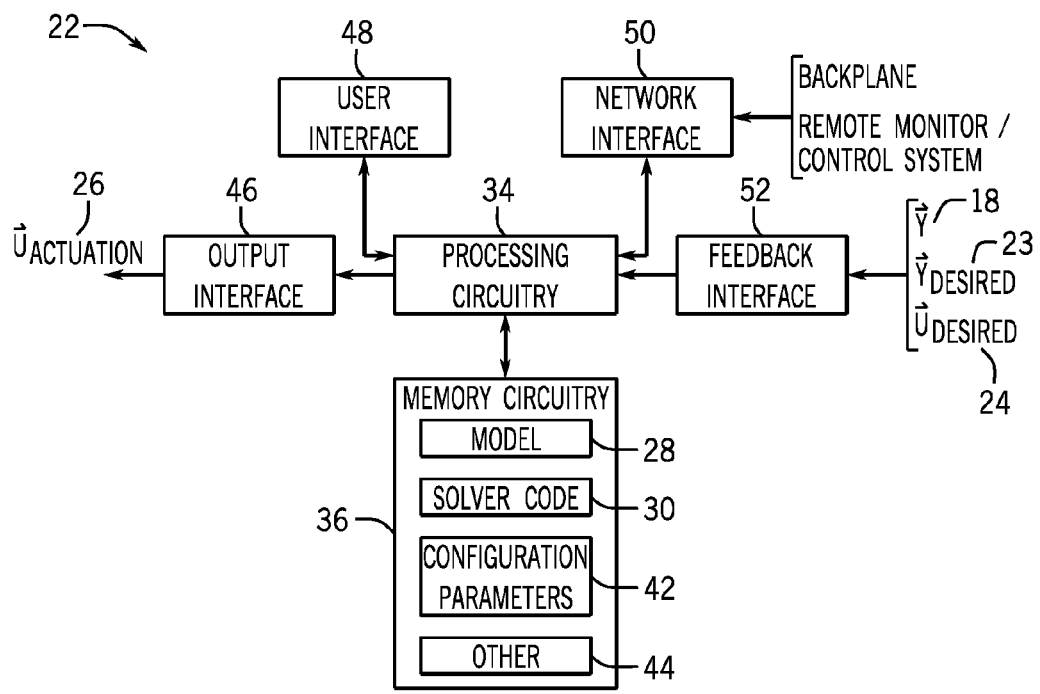
FIG. 2 depicts a block diagram of an embodiment of the deterministic optimization-based control from FIG. 1.
Figure 3:
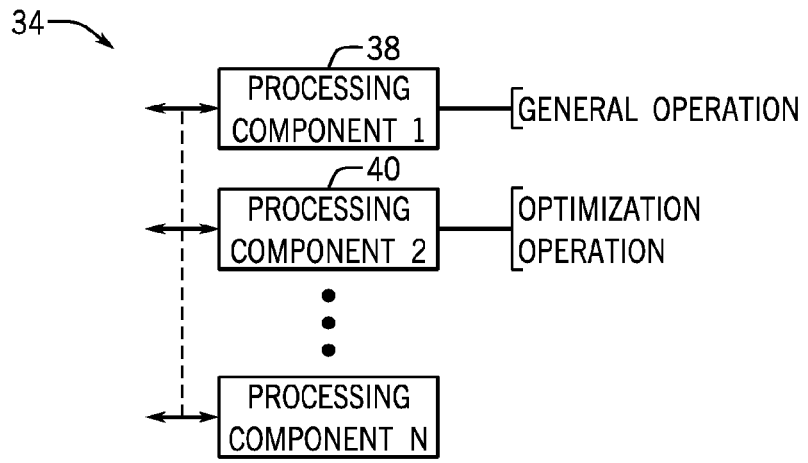
FIG. 3 depicts a block diagram of an embodiment of the processing circuitry from FIG. 2.

To facilitate the functions described herein, it should be appreciated that the OBC 22 may include a processor, useful for executing computing instructions (i.e., steps), and memory, useful for storing computer instructions (i.e., code) and/or data. As depicted in FIG. 2, the OBC 22 may implement the processor through processing circuitry 34 and the memory through memory circuitry 36. More specifically, the processing circuitry 34 may be configured to handle the general functionality of the control system, such as controlling actuators, as well as the functions of OBC 22, such as dynamic optimization. In addition, as depicted in FIG. 3, the processing circuitry 34 may include multiple processing components (e.g., parallel processor cores or separate processor modules), which may enable the processing circuitry 34 to better manage various functions. For example, as depicted, a first processing component 38 may perform the general operations of the control system 10. The general operations of the control system 10 may include controlling components of the control system 10, performing calculations, and the like.

As for the OBC 22 functions, the computationally intensive dynamic optimization may be performed on the second processing component 40. Accordingly, this enables the dynamic optimization to be called from the first processing component 38 and executed synchronously or asynchronously on the second processing component 40, which may improve the efficiency of the optimization calculation. Alternatively, it should be appreciated that the dynamic optimization may be performed on the first processing core 38 along with the general functions of the control system 10. Furthermore, as depicted, the processing circuitry 34 includes N processing components, which may each be configured to handle different functions, such as calculating a linear approximation, of the control system 10.

Turning back to FIG. 2, the memory circuit 36 may store computer instructions (i.e., code) describing the model 28, the deterministic solver 30, configuration parameters 42, as well as other instructions 44, such as computing virtual measurements for unmeasured process variables for the general functioning of the control system 10. Specifically, the instructions stored in the memory circuit may be configured to guide the functioning of the model 28 and the deterministic solver 30. Accordingly, the memory circuitry 36 is communicatively coupled to the processing circuitry 34 to enable to processing circuitry 36 to read and/or execute the instructions (i.e., steps).

Figure 4:
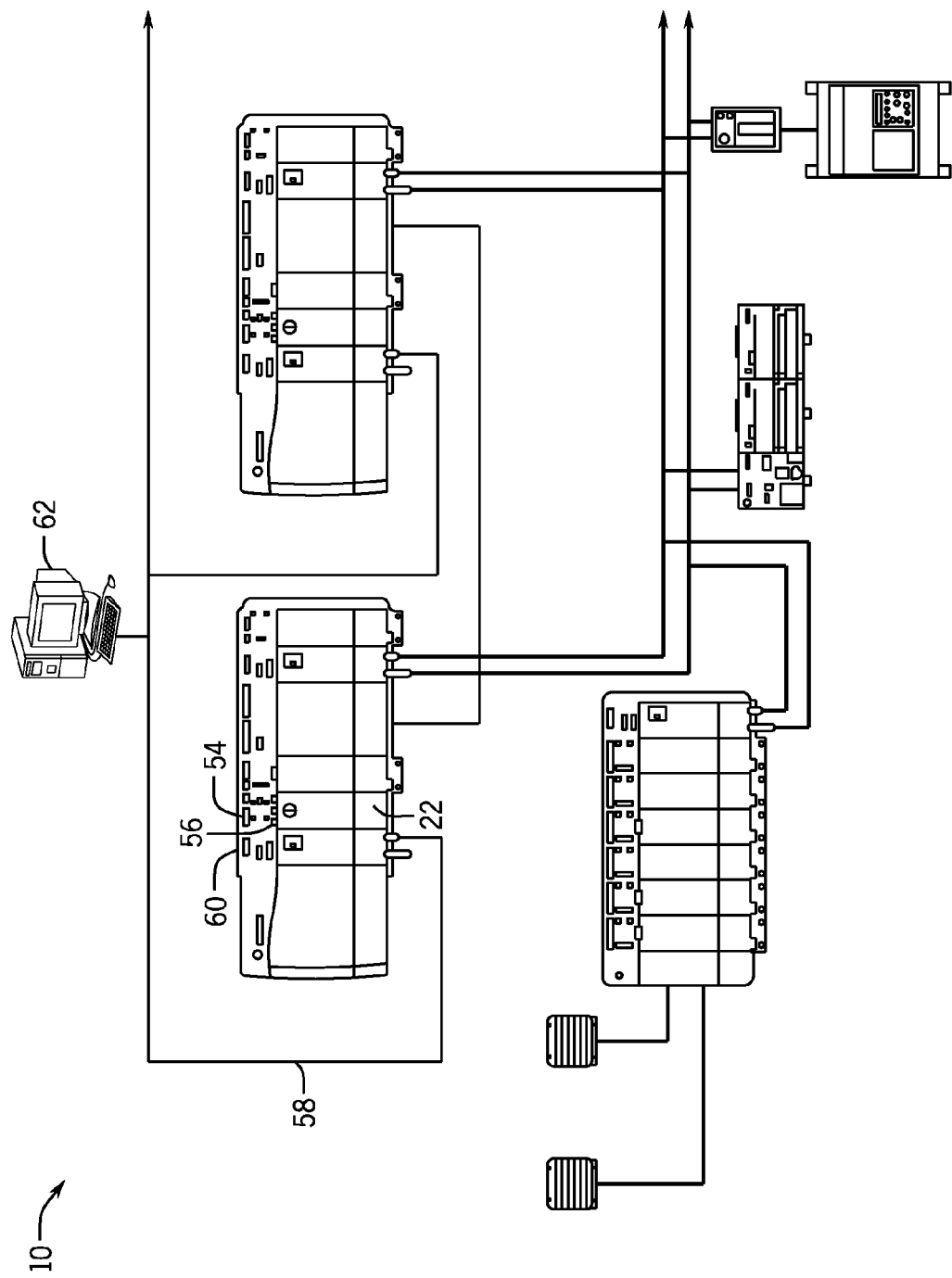
FIG. 4 depicts an embodiment of a deterministic OBC module communicatively coupled to other modules within the control system.

Furthermore, the depicted embodiment of the OBC 22 further includes an output interface 46, a user interface 48, a network interface 50, and a feedback interface 52. Specifically, the user interface 48 may be configured to enable a user to communicate with the OBC 22. For example, as depicted in FIG. 4, the user interface 48 may include a graphical-user-interface (GUI) 54 configured to display metrics of the OBC 22, such as the control trajectory 26 determined. In addition, the user interface 48 may include buttons 56, which enable the user to input commands to the OBC 22. Similar to the user interface 48, the network interface 50 may enable a user to communicate with the OBC 22 over a network 58, such as a wide-area-network (WAN). In some embodiments, the network 58 may be a EtherNet/IP Network or a ControlNet Network, available from Rockwell Automation, of Milwaukee, Wis. More specifically, as depicted in FIG. 4, the network interface 50 may be communicatively coupled to the network 58 via a communication module 60. Alternatively, the network interface 50 may be communicatively coupled directly the network 58 through the backplane of the OBC 22. Furthermore, as depicted, the network 58 may be communicatively coupled to a remote monitoring/control system 62, such as a supervisory control and data acquisition (SCADA), to enable the user to remotely communicate with the OBC 22. Accordingly, as depicted in FIG. 2, both the user interface 48 and the network interface 50 are communicatively coupled to the processing circuitry 34 to enable user commands to be communicated to the processing circuitry 34 and information concerning the OBC 22 to be communicated to the user. Note that each module in memory circuitry 36 may be configured such that it can respond as a server responding to the queries from various interfaces. For example, the model module 28 can be queried by the user interface to report its fidelity. In addition the model module 28 may be called by solver code module 30 to determine the optimal control trajectory.

Turning back to FIG. 2, as described above, the OBC 22 may be configured determine stabilizing feasible control trajectories for the control system 10 based on feedback from the plant/process 12. As such, the feedback interface 52 may be configured to receive feedback, such as the previous output variables 18, the desired output trajectory 23, the desired control trajectory 24, or any combination thereof, and communicate it to the processing circuitry 34. For example, the feedback interface 52 may be a serial port located on the backplane of the OBC 22, which enables the OBC 22 to receive samples from sensors in the control system 10. After the processing circuitry 34 determines a control trajectory 26, the control trajectory 26 is communicated to the output interface 46. As will be described in more detail below, the processing circuitry 34 may utilize various search functions (e.g., QP solvers) and stabilization functions to determine the control trajectory 26. Thus, the output interface 46 may be configured to transmit the control trajectory 26 to the plant/process 12. Similar to the feedback interface 52, the output interface 46 may be a serial port located on the backplane of the OBC 22 to enable the output interface to communicate with a controller controlling inputs into the plant/process 12. It should be appreciated that as described above, the controller may be the same processing component, a different core of a processor, or a different processor module.

Figure 5A:
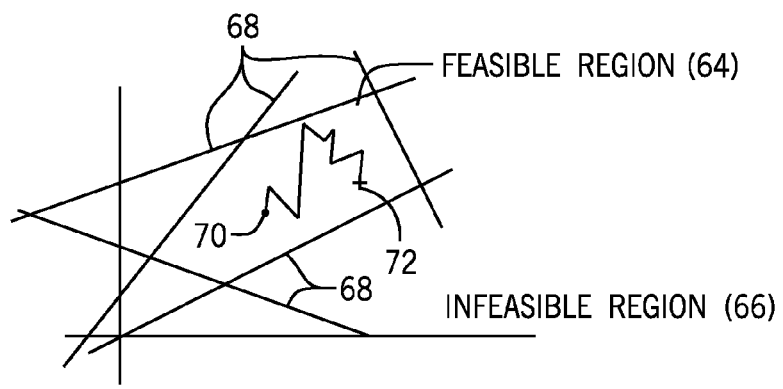
FIG. 5A depicts an embodiment of a feasible search method for solving a quadratic programming problem that has found an optimum solution.
Figure 5B:
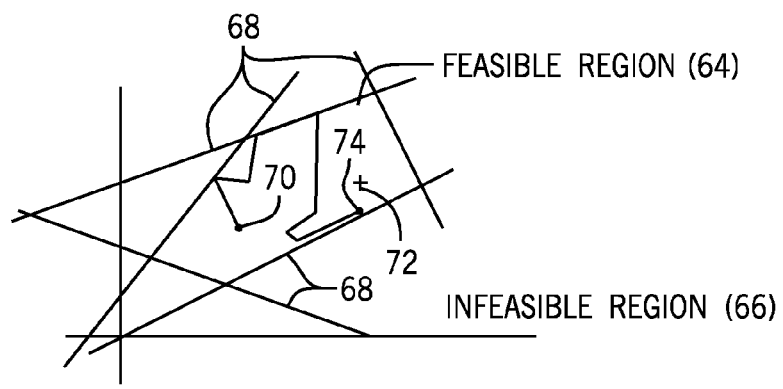
FIG. 5B depicts an embodiment of a feasible search method for solving the quadratic programming problem that has not found the optimum solution.
Figure 5C:
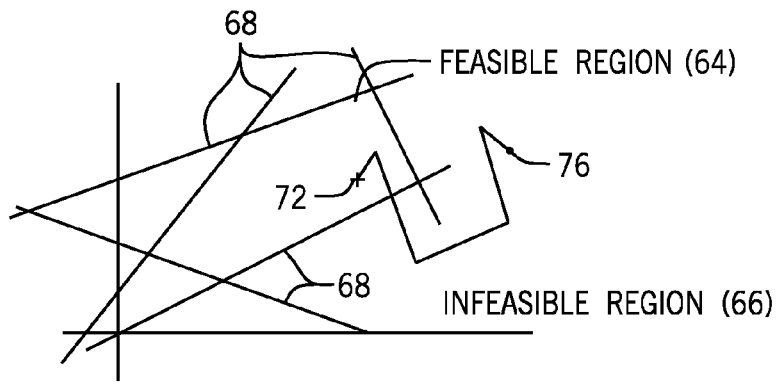
FIG. 5C depicts an embodiment of an infeasible search method for solving the quadratic programming problem that has found the optimum solution.

As described above, the processing circuitry may utilize various search methods to facilitate determining a control trajectory 26 (i.e., dynamic optimization). Examples of such search methods are depicted in FIGS. 5A-5C. Included in each figure, as depicted, is a feasible region 64 and an infeasible region 66. More specifically, the feasible region 64 is all of the solutions or control trajectories 26 that do not violate the constraints of the control system 10. On the other hand, the solutions or control trajectories 66 in the infeasible region violate the constraints of the control system 10 and are infeasible. As depicted, constraints are depicted as constraint lines 68, which separate the feasible region 64 and the infeasible region 66. As described above, the constraints may be the result of actuator limits, technological restrictions, economical restrictions, and/or safety restrictions.

As described above, the processing circuitry 34 may utilize various solver methods (i.e., algorithms) to facilitate determining a control trajectory 26 (i.e., dynamic optimization). Examples of such solver methods are depicted in FIGS. 5A-5C. Included in each figure, as depicted, is a feasible region 64 and an infeasible region 66. More specifically, the feasible region 64 is all of the solutions or control trajectories 26 that do not violate the constraints of the control system 10. On the other hand, the solutions or control trajectories 66 in the infeasible region violate the constraints of the control system 10 and are infeasible. As depicted, constraints are depicted as constraint lines 68, which separate the feasible region 64 and the infeasible region 66. As described above, the constraints may be the result of actuator limits, technological restrictions, economical restrictions, and/or safety restrictions.

Specifically, FIGS. 5A and 5B depict feasible search methods (i.e., algorithms) and FIG. 5C depicts an infeasible search method (i.e., algorithms). However, it should be appreciated that the figures are not meant to depict any particular search method or algorithm and are merely illustrative. As depicted in both FIG. 5A and FIG. 5B, the feasible search method begins from a feasible point 70 within the feasible region 64. From the starting feasible point 70, the feasible search method moves around the feasible region 64 searching for the optimum solution (i.e., control trajectory) 72 during the control time. In some cases, as shown in FIG. 5A, an optimum control trajectory 72 is found. In others, as shown in FIG. 5B, a suboptimal but still feasible control trajectory 74 is found. An example of a feasible search method is a primal active set solver method (i.e., algorithm). Comparatively, as depicted in FIG. 5C, the infeasible search method begins from an infeasible point 76 within the infeasible region 66. From the starting infeasible point 76, the infeasible search method determines infeasible solutions until it converges on the optimum solution (i.e., control trajectory) 72. An example of an infeasible search method is a dual active set solver method. Accordingly, it should be appreciated that, if terminated before the optimum control trajectory 72 is found, the feasible search method will produce a feasible control trajectory, but the infeasible search method may produce an infeasible control trajectory.

In addition, as described above, the dynamic optimization (e.g., feasible search method or infeasible search method) may be run asynchronously from the rest of the control system 10. Thus, if a less than optimum control trajectory is found during the control time, the optimization may continue into the following control times, which gives the OBC 22 more time for complex optimization calculations. Furthermore, when the optimum trajectory 72 is found, it may be time shifted, padded, and included in future optimization calculations.

Figure 6:
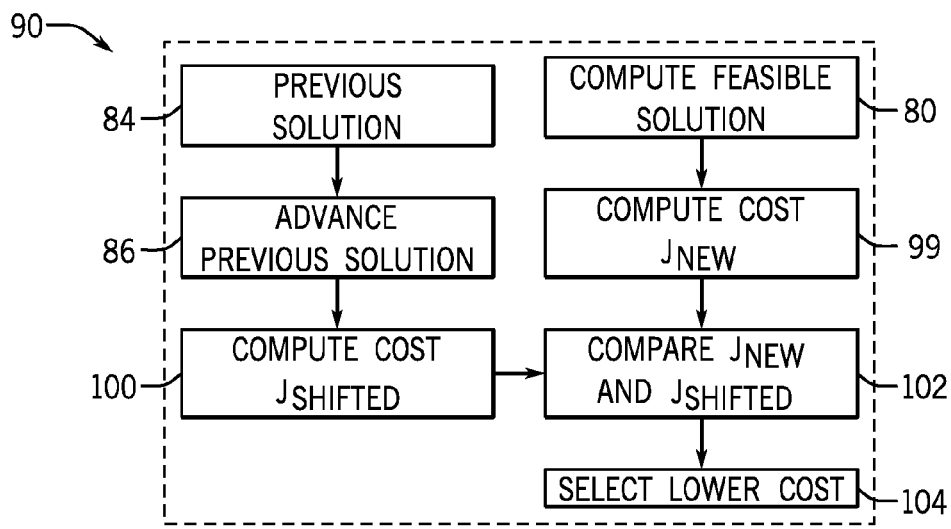
FIG. 6 depicts a block diagram of an embodiment of a stabilization process used in the optimization-based control.

Because in some embodiments the dynamic optimization calculation may find a suboptimal control trajectory 74 during the control time, a stabilization process 78 may be useful to stabilize the control system 10. In other words, the stabilization process 78 may be configured to reduce the risk that the cost of the control system 10 will increase because of the suboptimal control trajectory 74. As depicted in FIG. 6, the stabilization process 78 may begin by computing a feasible solution or control trajectory (process block 80). The feasible solution may be calculated in various manners. For example, as will be described in more detail below, a steady state optimization method may be used. Alternatively, other search methods, such as the primal active set solver method, may be used.

Figure 7A:
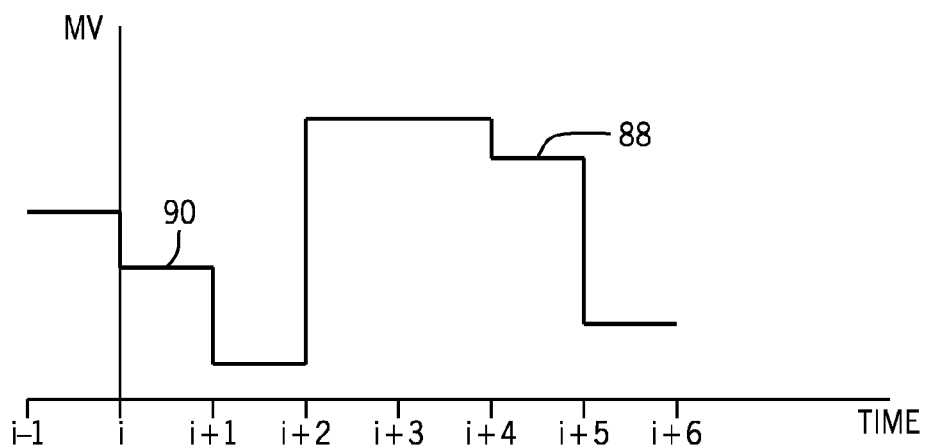
FIG. 7A depicts a first feasible solution for the quadratic programming problem.
Figure 7B:
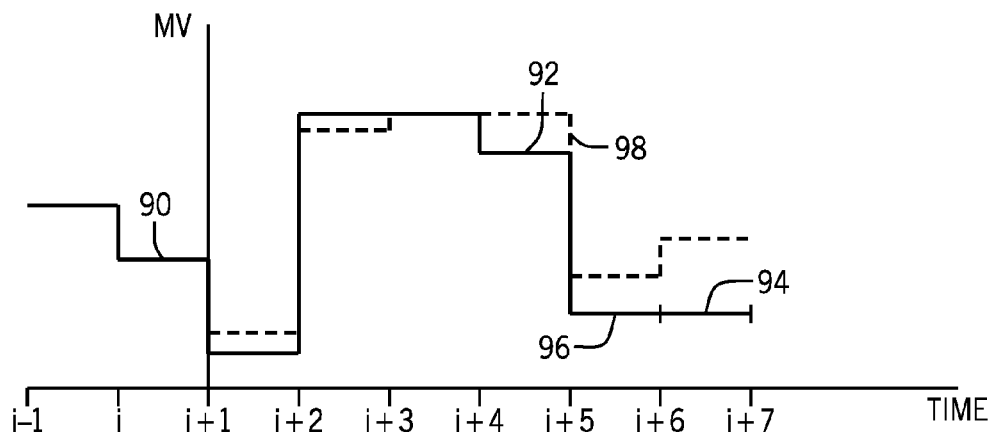
FIG. 7B depicts the first feasible solution advanced one step compared to a second feasible solution for the quadratic programming problem.

To stabilize the control system 10, the feasible solution determined in process block 80 (i.e., first stabilizing control trajectory) may be compared to a previous solution (i.e., second stabilizing control trajectory) determined in process block 84. More specifically, the previous solution is advanced, which may include shifting and padding, to the next control time (process block 86). As an example, FIG. 7A depicts a control trajectory 88 with a control horizon of six (i.e., six time steps) determined at a time i. As described above, the control trajectory 88 represents a setting of a manipulated variable, such as the percent a valve is open. Accordingly, based on the control trajectory 88, the control system 10 will take a first action 90 for the control time between time i and time i+1. At time i+1, the first action 90 has been performed. Thus, as depicted in FIG. 7B, the remaining control trajectory 88 (i.e., trajectory between time i+1 and time i+6) is time shifted to form a previous solution 92. In addition, because the control horizon for the time shifted control trajectory is five (i.e., five time steps), the previous solution is 92 is padded with an additional control system action 94. In some embodiments, this may include repeating the last control system action 96. Furthermore, FIG. 7B depicts a newly calculated solution 98, such as by process block 80, represented by the dashed line. Accordingly, the previous solution 92 may be compared to the newly calculated solution 98.

Turning back to FIG. 6, after the previous solution 92 and the newly calculated solution 98 are adjusted to the same control horizon, one characteristic to be compared may be the cost of each. Accordingly, based on the objective (i.e., cost) function, the cost for the newly calculated solution 98 (process block 99) and the cost of the previous solution 92 may be calculated (process block 100). Next, the cost of the new solution 98 is compared with the cost of the previous solution 92 (process block 102). Finally, the solution (i.e., control trajectory) with the lowest cost may be selected (process block 104).

Figure 8:
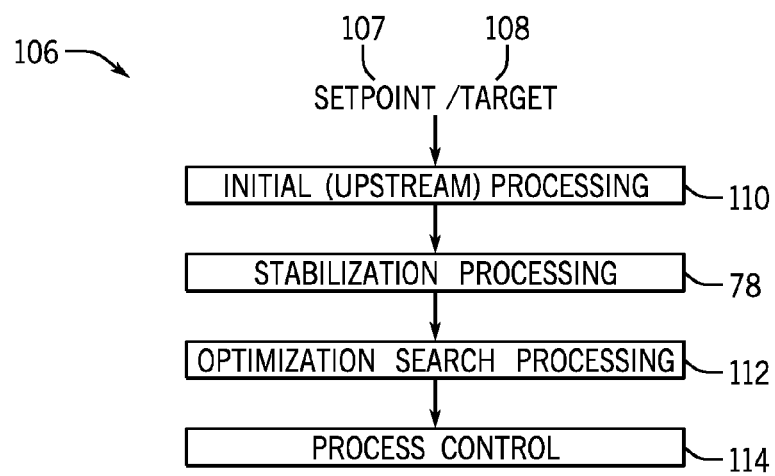
FIG. 8 depicts an embodiment of a process control utilizing the stabilization process depicted in FIG. 6.

As will be described in more detail below, the selected control trajectory may be utilized by the control system 10 to control the plant/process 12 by applying the selected control trajectory. For example, the selected control trajectory may be used directly to control the manipulated variables 20 input into the plant/process 12. Alternatively, as depicted in FIG. 8 the selected control trajectory may be used to in a stable deterministic optimization based control (OBC) process (i.e., algorithm) 106, which may be implements in the OBC 22. Beginning the process 106, user-defined setpoints 107 and/or feasible targets (i.e., infeasible setpoints mapped into feasible region) 108 may be input into an initial (i.e., upstream) processing, which may be configured to determine a feasible solution or control trajectory (process block 110). As described above, the initial processing (process block 110) may utilize any method to determine a feasible solution (i.e., control trajectory). Next the stabilization process may stabilize the control system 10 (process block 78). The solution selected by the stabilization process 78, may then be used to initialize a dynamic optimization (process block 112). This may be helpful especially when input into a feasible search method, which utilizes a feasible starting solution. For example, as will be described in more detail in the Detailed Example section, initializing a primal active set solver method (i.e., algorithm) with the solution selected by the stabilization process 78 may increase the efficiency of the optimization search 112. Finally, based on the control trajectory determined by the optimization search 112, the manipulated variables 20 input into the plant/process 12 may be controlled (process block 114).

Figure 9:
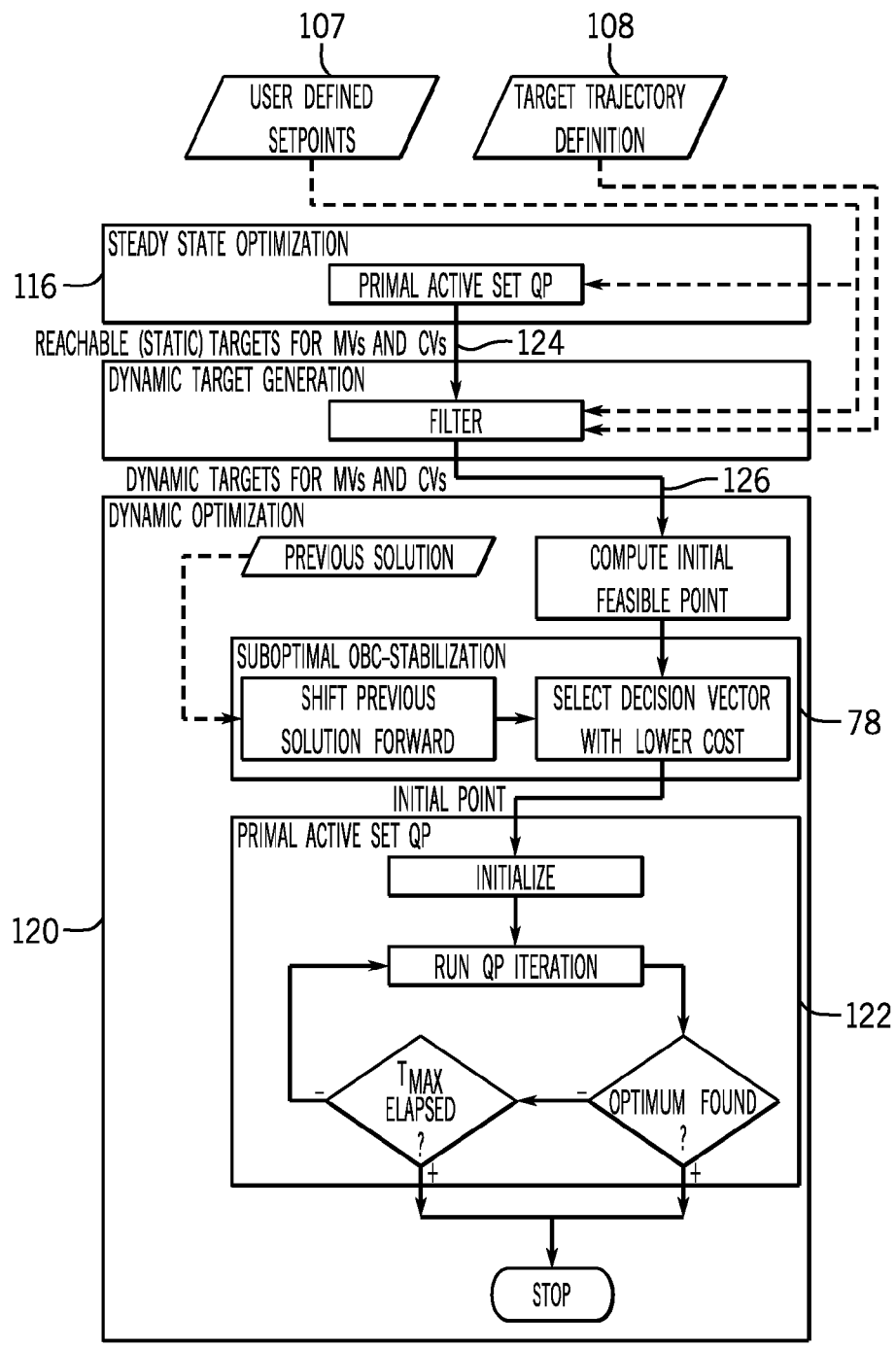
FIG. 9 depicts an embodiment of dynamic optimization-based control (OBC) utilizing a steady state block, a dynamic target generator block, and a dynamic optimization block.
Figure 10:
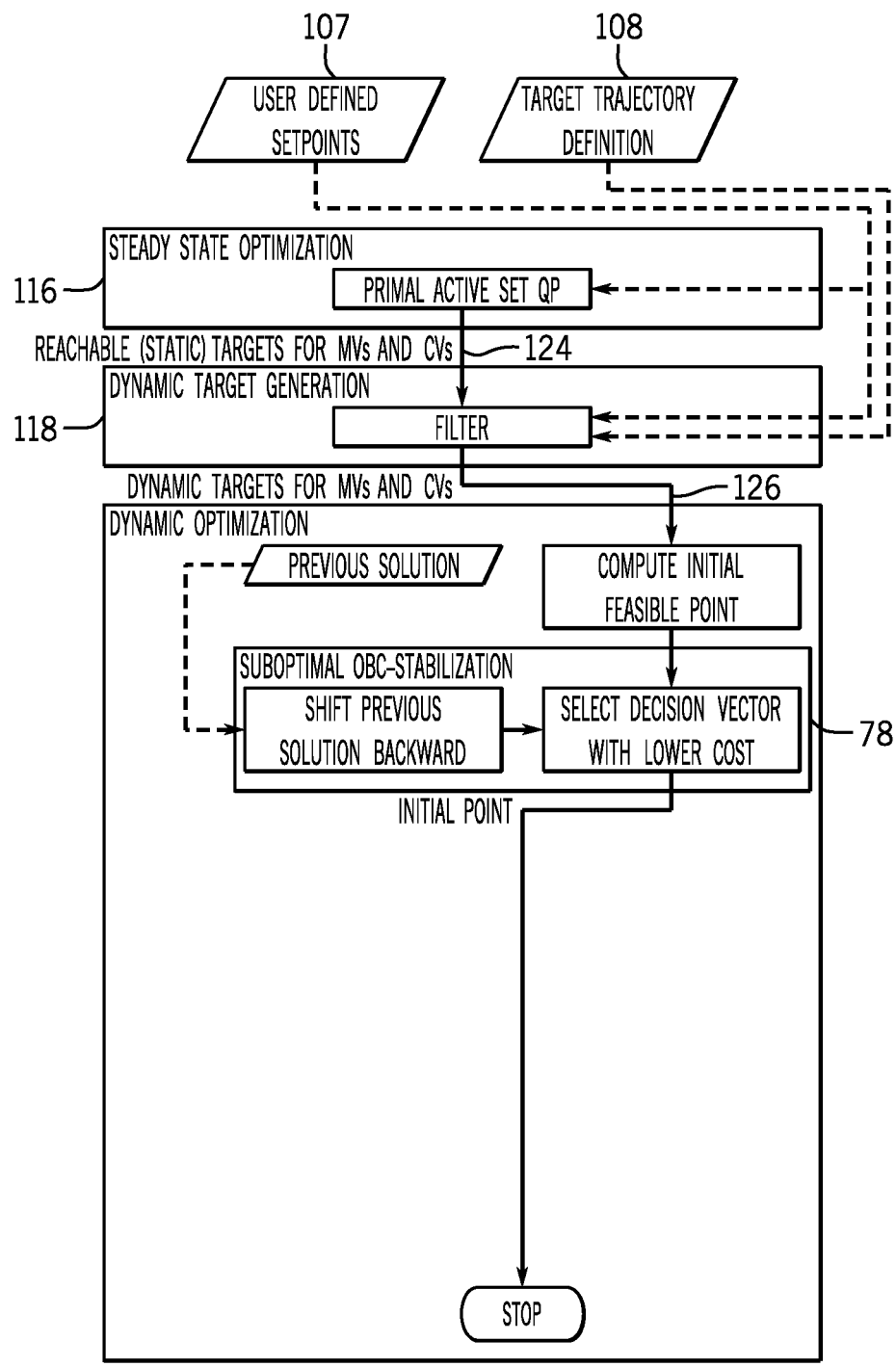
FIG. 10 depicts an embodiment of dynamic optimization-based control (OBC) utilizing a steady state block and a dynamic target generator block.
Figure 11:
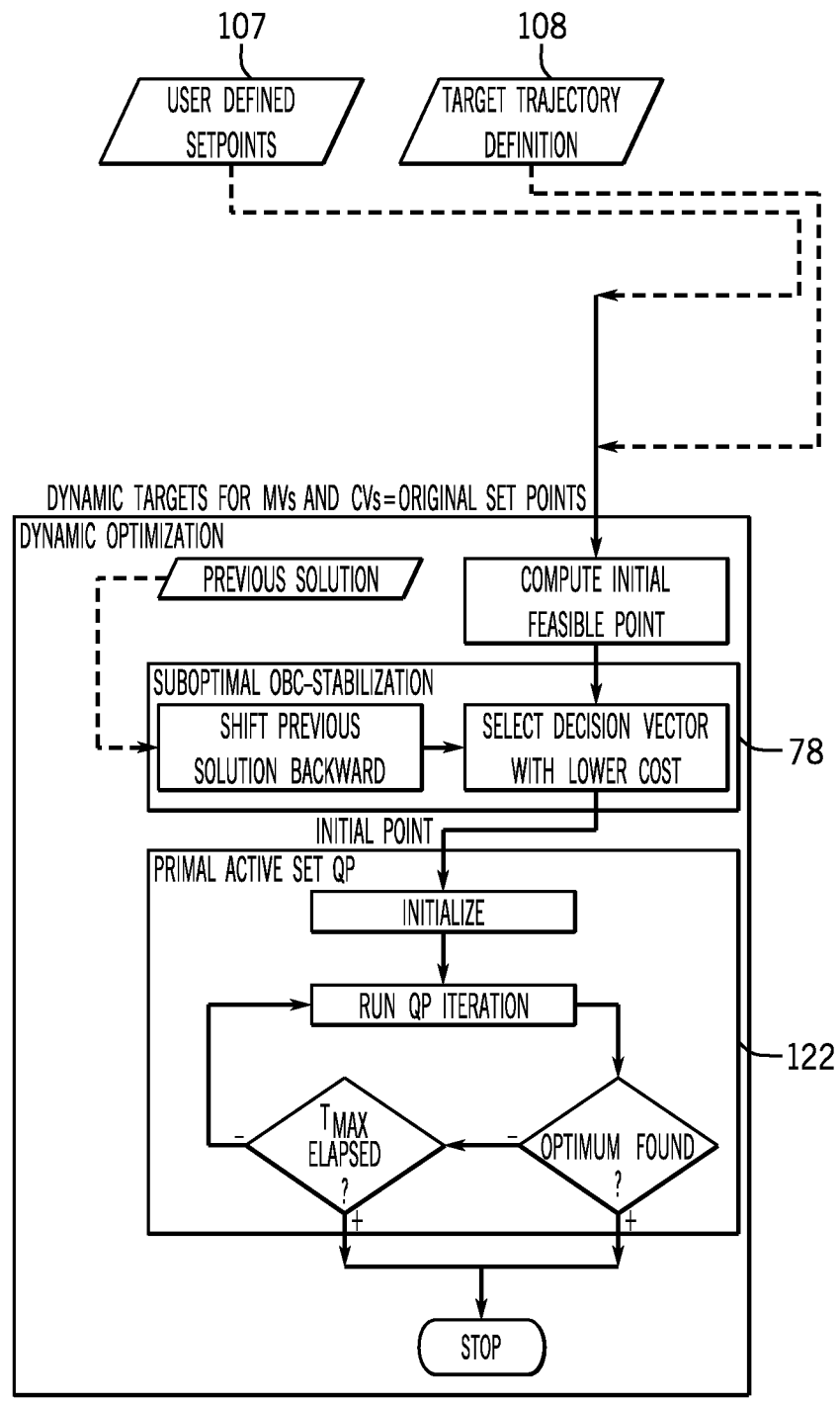
FIG. 11 depicts an embodiment of dynamic optimization-based control (OBC) utilizing a dynamic optimization block.

FIGS. 9-11 depict different embodiments of OBCs 22 utilizing the stable deterministic optimization based process control 106. Included in the three embodiments are three optional and configurable blocks: a steady state optimization block 116, a dynamic target generation block 118, and a dynamic optimization block 120. Accordingly, a user may choose an appropriate configuration of the OBC 22 that fits the specific needs of particular application in terms of closed loop performance, robustness and/or execution speed.

The steady state optimization block 116 can have two different purposes. The first goal of the steady state optimization block 116 is to find the most profitable steady-state control target based on the model 28 and the user-defined setpoints 107. The second goal of the steady state optimization block 116 is to find feasible steady-state targets that are as close to infeasible setpoints as possible, which may then be used in the dynamic optimization 112. In some embodiments, the steady-state target is a control trajectory with a single operating point. Furthermore, in some embodiments, the steady state optimization block 116 may account for control variable zones. In other words, a zone setpoint instead of a particular point. More specifically, the steady state optimization block may utilize soft constraints.

The dynamic target generation block 118 may be configured to generate feasible dynamic control trajectories based on the user-defined setpoints 107, feasible targets 108, and/or the steady-state targets. Accordingly, the effect of procrastination may be reduced and robustness may be satisfactory. As used herein, procrastination refers to a predicted control trajectory that is infeasible and thus not applied. For example, the dynamic target generation block 118 may be configured to generate feasible control trajectories by starting at each infeasible setpoint and terminating at the feasible target 108. In addition, the dynamic optimization block 120 may be configured to implement the dynamic optimization process 112.

Furthermore, as depicted in FIGS. 9-11, each embodiment includes the stabilization process 78.

FIG. 9 depicts an embodiment including the steady state optimization block 116, the dynamic target generation block 118, and the dynamic optimization block 120. In the depicted embodiment, the steady state optimization block 116, using a primal active set solver method (i.e., algorithm), is configured to determine steady-state targets 124. Next, the dynamic target generation block 118 is configured to generate, by filter combining, a feasible dynamic control trajectory 126. Accordingly, in the present embodiment, the steady state optimization block 116 and the dynamic optimization block 120 make up the initial processing 110. Thus, the stabilization process 78 may stabilize the control system 10 as described above. Based on the output (i.e., selected feasible control trajectory) from the stabilization process 78, the dynamic optimization block 120 may attempt to find the optimum solution (i.e., control trajectory). For example, the depicted embodiment uses the primal active set solver method (i.e., algorithm) 122. The OBC 22 embodiment depicted in FIG. 9 may be the most universal but the slowest configuration.

FIG. 10 depicts an embodiment including the steady state optimization block 116 and the dynamic target generation block 118. Similar to the embodiment depicted in FIG. 9, the depicted embodiment the steady state optimization block generates the steady state targets 124, the dynamic target generation block 118 generates a feasible dynamic control trajectory 126, and the stabilization process 78 stabilizes the control system 10. In this embodiment, the feasible control trajectory selected by the stabilization process 78 is directly passed to the control system 10. The OBC 22 embodiment depicted in FIG. 10 may be a good option for time critical applications.

FIG. 11 depicts an embodiment including the dynamic optimization block 120. In the depicted embodiment, the stabilization process 78 uses the user-inputted setpoint 107 as a control trajectory. Similar to the embodiment depicted in FIG. 9, based output from the stabilization process 78, the dynamic optimization block 120 may attempt to find the optimum solution (i.e., control trajectory). The OBC 22 embodiment depicted in FIG. 11 may be used for small scale applications with good closed loop performance.

DETAILED EXAMPLE

Below is a detailed example to help illustrate the techniques taught herein. First, as described above, the efficiency of the OBC 22 may be increased by simplifying the dynamic optimization calculation. In some embodiments, this may include simplifying the model 28. Generally, the model 28 may be expressed as a standard formula.

$$y = A_u \Delta u + y_{free} \tag{1}$$

where $\Delta u = [(\Delta u_1)^T, (\Delta u_2)^T, \ldots, (\Delta u_{n_u})^T]^T$—future changes of all inputs arranged in a vector $\Delta u_n = [\Delta u_n(t), \Delta u_n(t+1), \ldots, \Delta u_n(t+n_c-1)]^T$—future changes of n-th input $y = [(y_1)^T, (y_2)^T, \ldots, (y_{n_y})^T]^T$—all predicted output trajectories arranged in a vector $y_j = [y_j(t+1), \ldots, y_j(t+p)]^T$—predicted trajectory of j-th output $y_{free} = [(y_{free}^1)^T, (y_{free}^2)^T, \ldots, (y_{free}^{n_y})^T]^T$—all free response trajectories arranged in a vector $y_{free}^j = [y_{free}^j(t+1), \ldots, y_{free}^j(t+p)]^T$—free response trajectory of j-th output $n_u$—number of inputs
$n_y$—number of outputs
$n_c$—control horizon
p—prediction horizon
$N=n_c$—number of control moves Specifically, the standard formula (equation 1) reflects the superposition principle: the total future response (i.e., output trajectory) is a sum of responses to future inputs and responses to past inputs, disturbances, and initial conditions (i.e., $y_{free}$). The response $y_{free}$, may be updated at each sample time according to particular model structure. Accordingly, the predicted output trajectory of the j-th output may be expressed similar to equation 1.

$$y_j = A_{uj}\Delta u + y_{free}^j \quad (2)$$

where $A_{uj} = [A_{uj}^1, A_{uj}^2, \ldots, A_{uj}^{n_u}]$—prediction matrix of j-th output
$A_u = [A_{u1}^T, A_{u2}^T, \ldots, A_{un_y}^T]^T$—prediction matrix Furthermore, the following equation represents the changes of inputs (i.e., incremental inputs).

$$\Delta u(k) = u(k) - u(k-1) \quad (3)$$

In addition, the following represent the absolute inputs.

$u_n = [u_n(t), u_n(t+1), \ldots, u_n(t+n_c-1)]^T$—future trajectory of n-th input $u = [(u_1)^T, \ldots, (u_2)^T, \ldots, (u_{n_u})^T]^T$—all future input trajectories arranged in a vector (4)

Thus, to help simplify the above equations, relative inputs may be used instead of incremental inputs. Specifically, the constraints may be simplified and the Hessian matrix may be better conditioned. As used herein $u_r$ represents the relative input and is defined as difference from current value of input. Accordingly, $u_r$ may be expressed as follows.

$$u_{ri}(k) = u_i(k) - u_{0i} \quad (5)$$

where $u_{ri}$—i-th relative input
$u_{0i} = u_i(t-1)$—current value of the i-th input Based on the definition of $u_r$, equation (5) may alternatively expressed as follows.

$$u_{ri} = u_i - 1 u_{0i}, \quad 1^T = [1,1,\ldots 1]^T \quad (6)$$

Thus, the linear transformation between the relative input ($u_r$) and the incremental input ($\Delta u$) is as follows.

$$\Delta u_i(k) = u_i(k) - u_i(k-1) = \Delta u_{ri}(k) = u_{ri}(k) - u_{ri}(k-1) \quad (7)$$

$$u_{ri}(k) = \sum_{j=t}^{k} \Delta u_i(j)$$

$$u_{ri} = S\Delta u_i,$$

$$S = \begin{bmatrix} 1 & 0 & 0 & \ldots & 0 \\ 1 & 1 & 0 & & 0 \\ 1 & 1 & 1 & & 0 \\ \vdots & & & \ddots & 0 \\ 1 & 1 & 1 & 1 & 1 \end{bmatrix},$$

$$\Delta u_i = S^{-1} u_{ri},$$

$$S^{-1} = \begin{bmatrix} 1 & 0 & 0 & \ldots & 0 \\ -1 & 1 & 0 & & 0 \\ 0 & -1 & 1 & & 0 \\ \vdots & & & \ddots & \vdots \\ 0 & 0 & \ldots & -1 & 1 \end{bmatrix}$$

$$\Delta u = S_c^{-1} u_r,$$

$$S_c^{-1} = \begin{bmatrix} S^{-1} & 0 & \ldots & 0 \\ 0 & S^{-1} & & 0 \\ \vdots & & \ddots & \\ 0 & 0 & & S^{-1} \end{bmatrix},$$

$$u_r = S_c \Delta u,$$

$$S_c = \begin{bmatrix} S & 0 & \ldots & 0 \\ 0 & S & & 0 \\ \vdots & & \ddots & \\ 0 & 0 & & S \end{bmatrix}$$

$$u_r = u = I_c u_0,$$

$$I_c = \begin{bmatrix} 1 & 0 & \ldots & 0 \\ 0 & 1 & & 0 \\ \vdots & & \ddots & \\ 0 & 0 & & 1 \end{bmatrix},$$

$$u_0 = \begin{bmatrix} u_{01} \\ u_{02} \\ \vdots \\ u_{0n_u} \end{bmatrix}$$

$$u = S_c \Delta u + I_c u_0$$

Accordingly, the model 28 (i.e., equation 1) based on the relative input may be expressed as follows.

$$y = A_u \Delta u + y_{free} = (A_u S_c^{-1}) u_r + y_{free} = A_r u_r + y_{free} \quad (8)$$

Figure 12:
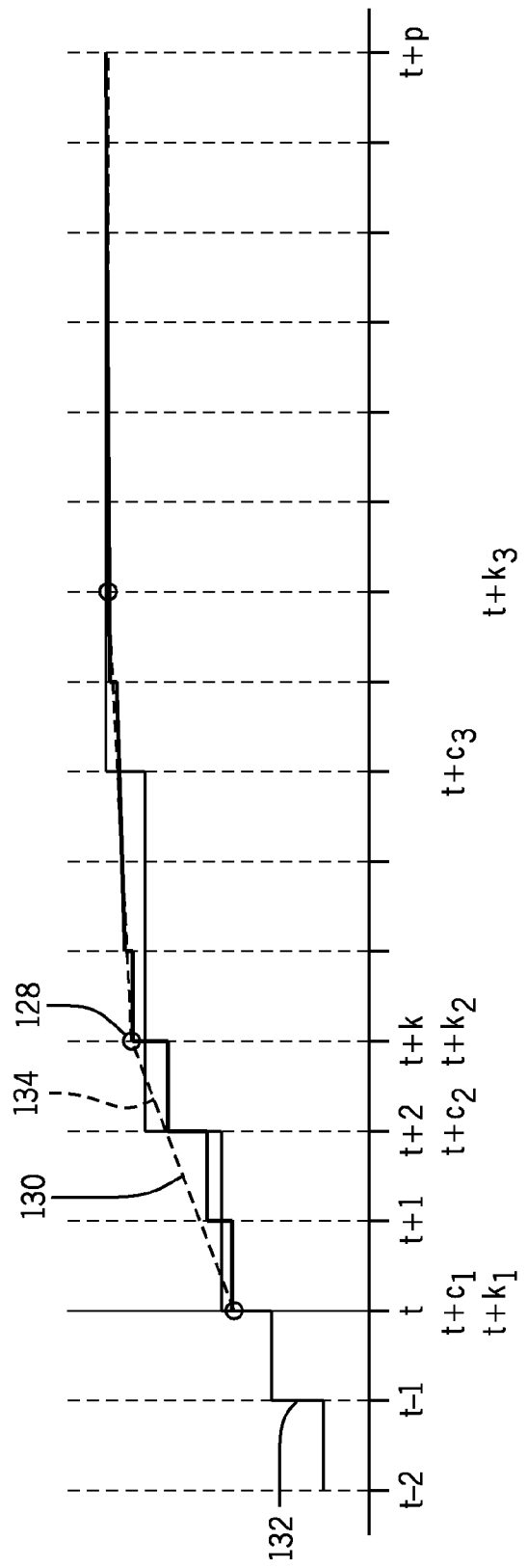
FIG. 12 depicts an approximation based on control blocking compared to one based on linear control blocking.

To further simplify and improve the model 28, linear control blocking may be utilized. Generally, control blocking may simplify model 28 by changing control inputs at specified control times (i.e., $t+c_j$). In other words, control blocking results in a piece-wise constant control trajectory. To better approximate general smooth control trajectories linear control blocking may be utilized. Specifically, linear control blocking may result in a piece-wise linear control trajectory while the number of decision variables remains the same. For example, as in FIG. 12, the break points 128 of the piece-wise linear trajectory 130 is specified at the following sample times $(t+k_1), (t+k_2), \ldots, (t+k_N)$ where $k_1=0$ and $k_N=n_c-1$. The decision vector for implementing linear control blocking ($u_L$) is given by the values of relative input ($u_r$) at the specified sample times.

$$u_L = [u_r(t), u_r(t+k_2), \ldots, u_r(t+k_N)]^T \quad (9)$$

Accordingly, the values between the break points 128 may be calculated by linear interpolation as follows.

$$u_r(i) = \begin{cases} -\frac{i-(t+k_{j+1})}{k_{j+1}-k_j}u_L(t+k_j) + \frac{i-(t+k_j)}{k_{j+1}-k_j}u_L(t+k_{j+1}) & i \in [t+k_j, t+k_{j+1}], \\ u_L(t+k_N), & i \in [t+k_N+1, t+p-1] \end{cases} \quad (10)$$

$$j = 1 \ldots N$$

$$u_r = [u_r(t), u_r(t+1), \ldots, u_r(t+p-1)]^T$$

Accordingly, a model using control blocking is represented by control trajectory 132 and a model using linear control blocking is represented by control trajectory 134. It follows that $u_r(i)$ can be expressed as a linear combination of the break point values as follows.

$$u_r(i) = \sum_{j=1}^{N} f_{ij} u_L(t+k_j) \quad (11)$$

$$f_{ij} = \begin{cases} -\frac{i-(t+k_{j+1})}{k_{j+1}-k_j} & i \in [t+k_j, t+k_{j+1}] \\ \frac{i-(t+k_{j-1})}{k_j-k_{j-1}} & i \in [t+k_{j-1}, t+k_j] \\ 1 & i \in [t+k_N+1, t+p-1] \\ 0 & \text{otherwise} \end{cases}$$

$$f_{iN} = \begin{cases} \frac{i-(t+k_{N-1})}{k_N-k_{N-1}} & i \in [t+k_{N-1}, t+k_N] \\ 1 & i \in [t+k_N+1, t+p-1] \\ 0 & \text{otherwise} \end{cases}$$

$$j = 1 \ldots N-1$$

And, in matrix notation we get the following formula.

$$u_r = F u_L, F(i,j) = f_{ij} \quad (12)$$

As a result, the model 28 may be expressed in the following way without increasing the number of decision variables.

$$y = A_u \Delta u + y_{free} = A_u S^{-1} u_r + y_{free} = A_u S^{-1} F u_L + y_{free}$$

$$A_L = A_u S^{-1} F$$

$$y = A_L u_L + y_{free} \quad (13)$$

In addition to simplifying the model 28, the cost function (i.e., objection function) may also be simplified to enhance the efficiency of the OBC 22. Generally, a quadratic objective function may be expressed as follows.

$$J_y = \sum_{j=1}^{n_y} (y_j - y_j^t)^T W_j (y_j - y_j^t) + \sum_{n=1}^{n_u} \Delta u_n^T B_n \Delta u_n + \sum_{n=1}^{n_u} (u_n - u_n^t)^T V_n (u_n - u_n^t) \quad (14)$$

where
$W_j, B_n, V_n$—positive semidefinite weight matrices (tuning parameters)
$y_j^t = [y_j^t(t+1), y_j^t(t+2), \ldots, y_j^t(t+p)]^T$—output target trajectory
$u_n^t = [u_n^t(t+1), u_n^t(t+2), \ldots, u_n^t(t+p)]^T$—input target trajectory Using standard algebraic manipulation the objective function can be transformed to the following quadratic form.

$$J_y(\Delta u) = \tfrac{1}{2}\Delta u^T G_y \Delta u + f_y^T \Delta u + C \quad (15)$$

where $G_y$ is Hessian, $f_y$ is a linear term and C is constant term that can be omitted for optimization. We assume that $B_n$ matrices are positive definite and so $G_y$ is also positive definite.

One of the most important features of OBC is that it can handle constraints. The constraints for the n-th input may be represented as follows.

$i = 0 \ldots n_c - 1$:

$u_{min}(n) \leq u_n(t+i) \leq u_{max}(n)$—simple bounds $\Delta u_{min}(n) \leq \Delta u_n(t+i) \leq \Delta u_{max}(n)$—rate of change constraints (16)

In a compact form, the constraints may be represented as follows.

$$\Delta u_{max} = [\Delta u_{max}(1), \ldots, \Delta u_{max}(n_u)]^T$$

$$\Delta u_{min} = [\Delta u_{min}(1), \ldots, \Delta u_{min}(n_u)]^T$$

$$I_c \Delta u_{min} \leq \Delta u \leq I_c \Delta u_{max}$$

$$u_{max} = [u_{max}(1), \ldots, u_{max}(n_u)]^T$$

$$u_{min} = [u_{min}(1), \ldots, u_{min}(n_u)]^T$$

$$u_{min} \leq u \leq u_{max}$$

$$u_{min} \leq S_c \Delta u + I_c u_0 \leq u_{max}$$

$$I_c(u_{min} - u_0) \leq S_c \Delta u \leq I_c(u_{max} - u_0) \quad (17)$$

In some cases, controlled variable (i.e., output) may lie within a specific range (i.e., between $y_{min}$ and $y_{max}$). This formulation may lead to more robust and less aggressive control actions but may also results in a more complex optimization calculation. However, if the optimization calculation has hard constraints on outputs, then an infeasible control trajectory may be found. Accordingly, soft constraints with slack variables may be used. However, in order to not to dramatically increase number of decision variables or number of complex constraints, the optimization calculation may be simplified by only adding one additional variable with simple bounds per constrained output. This additional variable may be interpreted as an optimized target that must lie within the specific output range (i.e., between $y_{min}$ and $y_{max}$). For example, output target trajectory $y^t$ may be defined by an additional decision variable z and the constrained outputs may be defined by $n_z$ with indices $k_1 \ldots k_{nz}$. Accordingly, objective function and constraints may be defined as follows.

$$J_z(\Delta u, z) = \sum_{i=1}^{n_z} (y_{k_i} - 1 z_i)^T M_i (y_{k_i} - 1 z_i) \qquad (18)$$

$$= \begin{bmatrix} \Delta u \\ z \end{bmatrix}^T G_z \begin{bmatrix} \Delta u \\ z \end{bmatrix} + f_z^T \begin{bmatrix} \Delta u \\ z \end{bmatrix} + C$$

$$y_{min} \leq z \leq y_{max}$$

$$1 = [1, 1, \ldots 1]^T,$$

$$z = [z_1, z_2, \ldots z_{n_z}]^T$$

$$y_{max} = [y_{max}(1), \ldots, y_{max}(n_z)]^T,$$

$$y_{min} = [y_{min}(1), \ldots, y_{min}(n_z)]^T$$

Furthermore, because overall objective function J is then sum $J = J_y + J_z$ the optimization calculation may be as follows.

$$\min_{\Delta u, z} J(\Delta u, z) = \begin{bmatrix} \Delta u \\ z \end{bmatrix}^T G \begin{bmatrix} \Delta u \\ z \end{bmatrix} + f^T \begin{bmatrix} \Delta u \\ z \end{bmatrix} + C \qquad (19)$$

$$I_c \Delta u_{min} \leq \Delta u \leq I_c \Delta u_{max}$$

$$I_c (u_{min} - u_0) \leq S_c \Delta u \leq I_c (u_{max} - u_0)$$

$$z_{min} \leq z \leq z_{max}$$

Using the transformation $\Delta u = S_c^{-1} u_r$ in equation (7), the optimization problem based on relative inputs ($u_r$) is as follows.

$$\min_{u_r, z} J_r(u_r, z) = \begin{bmatrix} u_r \\ z \end{bmatrix}^T G_r \begin{bmatrix} u_r \\ z \end{bmatrix} + f_r^T \begin{bmatrix} u_r \\ z \end{bmatrix} \qquad (20)$$

$$I_c (u_{min} - u_0) \leq u_r \leq I_c (u_{max} - u_0)$$

$$I_c \Delta u_{min} \leq S_c^{-1} u_r \leq I_c \Delta u_{max}$$

$$z_{min} \leq z \leq z_{max}$$

Figure 13A:
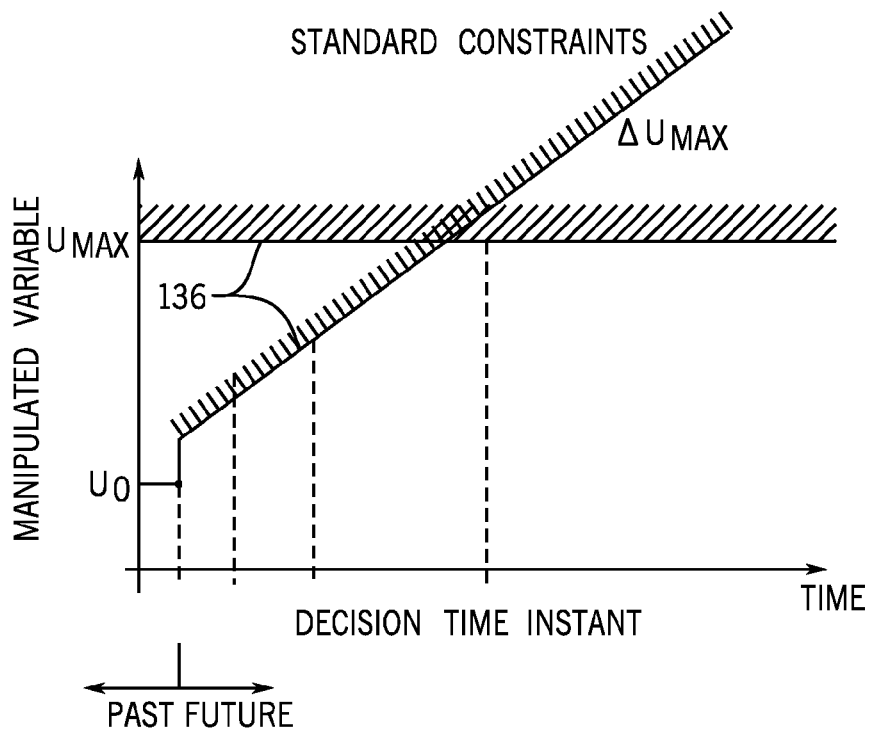
FIG. 13A depicts an embodiment of complex constraints.
Figure 13B:
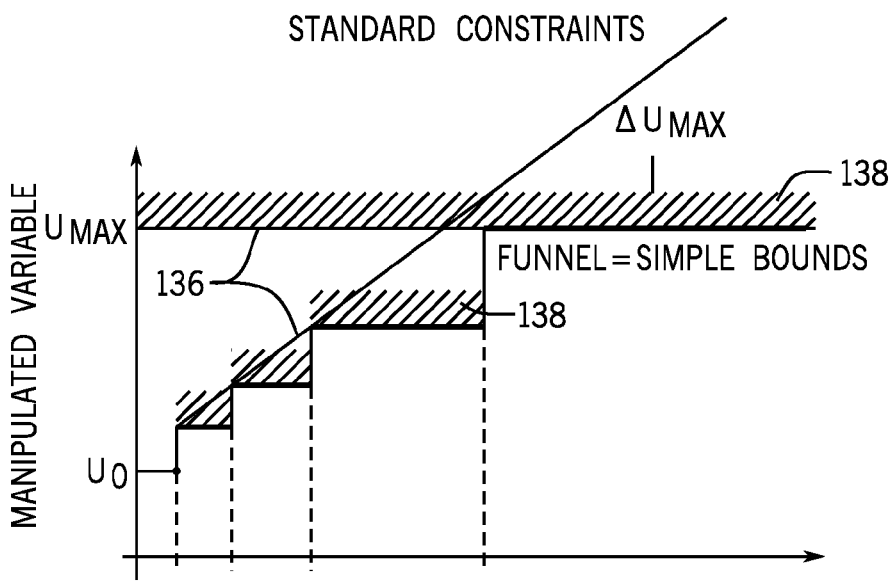
FIG. 13B depicts and embodiments simple bound constraints acting as a funnel for the complex constraints.

Accordingly, taking advantage of that fact that feasible search method more efficiently hand simple bound constraints as compared to complex constraints 136 (e.g., a rate of change constraint), depicted in FIG. 13A, the simple bound constraints 138 may be configured to act as a funnel as depicted in FIG. 13B. Thus, the simple bounds may be expressed as follows.

$$n = 1 \ldots n_u: \qquad (21)$$

$$u_{max}^m(i) = \min(u_{max}(n) - u_0(n), i \cdot \Delta u_{max}(n)), i = 1 \ldots n_c$$

$$u_{min}^m(i) = \max(u_{min}(n) - u_0(n), -i \cdot \Delta u_{min}(n))$$

$$u_{max}^m = [u_{max}^m(1), \ldots, u_{max}^m(n_c)]^T,$$

$$u_{max}^r = \left[ (u_{max}^{r1})^T, \ldots, (u_{max}^{rn_u})^T \right]^T$$

$$u_{min}^m = [u_{max}^m(1), \ldots, u_{max}^m(n_c)]^T,$$

$$u_{min}^r = \left[ (u_{min}^{r1})^T, \ldots, (u_{min}^{rn_u})^T \right]^T$$

Thus, the optimization calculation may be expressed as follows.

$$\min_{u_r, z} J_r(u_r, z) = \begin{bmatrix} u_r \\ z \end{bmatrix}^T G_r \begin{bmatrix} u_r \\ z \end{bmatrix} + f_r^T \begin{bmatrix} u_r \\ z \end{bmatrix} \qquad (22)$$

$$u_{min}^r \leq u_r \leq u_{max}^r$$

$$I_c \Delta u_{min} \leq R u_r \leq I_c \Delta u_{max},$$

$$z_{min} \leq z \leq z_{max}$$

$$R = \begin{bmatrix} R_u & 0 & \cdots & 0 \\ 0 & R_u & & 0 \\ \vdots & & \ddots & \\ 0 & 0 & & R_u \end{bmatrix}, R_u = \begin{bmatrix} -1 & 1 & 0 & & 0 \\ 0 & -1 & 1 & & 0 \\ & & & \ddots & \vdots \\ 0 & 0 & \cdots & -1 & 1 \end{bmatrix},$$

Furthermore, using a common variable $x = [u_r^T, z^T]^T$ with n elements we get the following resulting optimization problem in a standard form as follows.

$$\min_x J_r(x) = x^T G_r x + f_r^T x \qquad (23)$$

$$x_{min} \leq x \leq x_{max}$$

$$\Delta x_{min} \leq R x \leq \Delta x_{max}$$

$$R = \begin{bmatrix} R_u & 0 & \cdots & 0 \\ 0 & R_u & & 0 \\ \vdots & & \ddots & \\ 0 & 0 & & R_u \end{bmatrix}, R: n_u(N-1) \times n,$$

$$R_u = \begin{bmatrix} -1 & 1 & 0 & & 0 & \cdots & 0 \\ 0 & -1 & 1 & & 0 & & 0 \\ & & & \ddots & \vdots & & \\ 0 & 0 & \cdots & -1 & 1 & & 0 \end{bmatrix}, R_u: (N-1) \times n$$

$$n = n_u N + n_z$$

where n—number of decision variables (length of x)

$n_u$—number of inputs (manipulated variables)

N—number of control moves (blocks) per control input $n_z$—number of constrained outputs (controlled variables)

R—delta constraints

It should be notes that the constraints include both a lower and upper bound ($bl \leq C^T x \leq bu$). Accordingly the constraints may be expressed as follows.

$$\begin{array}{l} x_{min} \leq x \leq x_{max} \\ \Delta x_{min} \leq R x \leq \Delta x_{max} \end{array} \Leftrightarrow bl \leq C^T x \leq bu \Leftrightarrow bl(i) \leq c_i^T x \leq bu(i), \qquad (24)$$

$$i = 1 \ldots m$$

However, the sign of the dual variables (u) corresponding to constraints with active upper bounds may be changed. As used herein, a dual variable may be a Laplace multiplier. The Lagrange condition for optimum is then that all dual variables are nonnegative or equivalently dual variables corresponding to active lower bounds are nonnegative and dual variables corresponding to active upper bounds are non-positive. Furthermore, sets are defined as follows.

K={1,2, ... m}—set of all constraints
A⊆K—a subset of constraints
|A|—number of constraints in A Accordingly, the active set is a subset A⊆K which includes the constraints that are satisfied at the current point (x). In other words, for all i∈A either $c_i^T x = bl(i)$ or $c_i^T x = bu(i)$. In addition, a set of active normal vectors may be defined as $N_A = \{c_i; i \in A\}$ and the active matrix as $N = [n_1, \ldots n_q]$ composed of all active normal vectors $n_k = C_{i_k} \in N_A$. A unique correspondence may be found between indices k and $i_k$ given by an index table $I_A: i_k = I_A(k)$. At the current point the following equality may exist where b is composed of the corresponding components of bl and bu.

$$N^{Tx=b} \tag{25}$$

Furthermore, To recognize if the active constraint corresponds to an upper or lower bound we define a vector of flags $sf_A$ as follows.

$$sf_A(k) = \begin{cases} -1 & \text{if } n_k^T x = bl(I_A(k)) \\ 0 & \text{otherwise} \end{cases} \tag{26}$$

$$k = 1 \ldots q$$

Next, the efficiency of the search method utilized in the dynamic optimization 112 may be improved. As described above, one optimization search method that may be utilized is the primal active set solver method. Generally, a primal active set solver method starts from a feasible starting point; however, this may be computationally complex. Accordingly, by exploiting the structure of the optimization calculation, it may be beneficial to simplify finding a feasible starting point.

For example, a good candidate for a feasible starting candidate may be an unconstrained optimum as follows.

$$x_u = -G^{-1}f = -U^{-T}U^{-1}f \tag{27}$$

Next, the bounds for $x_u$ may be clipped to satisfy the simple bounds as follows.

$$'x_s(i) = \begin{cases} x_{max}(i) & \text{if } x_u(i) > x_{max}(i) \\ x_{min}(i) & \text{if } x_u(i) < x_{min}(i) \\ x_u(i) & \text{otherwise} \end{cases} \tag{28}$$

$$i = 1 \ldots n$$

Finally, $x_u$ may be clipped to satisfy delta constraints as follows.

$$'x_{cu}(i) = \begin{cases} x_s(1) & \text{if } i = 1 \\ x_{cu}(i-1) + \Delta x_{max}(i) & \text{if } x_s(i) > x_{cu}(i-1) + \Delta x_{max}(i) \\ x_{cu}(i-1) - \Delta x_{min}(i) & \text{if } x_s(i) < x_{cu}(i-1) - \Delta x_{min}(i) \\ x_s(i) & \text{otherwise} \end{cases} \tag{29}$$

$$i = 1 \ldots n$$

Optionally, further element-wise optimization may be performed. Specifically, when at a point x with gradient g=g(x), element-wise optimization may begin by updating x as follows.

$$'x(i) = x(i) - g(i)/G(i,i), i = 1 \ldots n \tag{30}$$

Calculating the gradient will be discussed in more detail below. Next, 'x may again be clipped. This procedure may be repeated a predefined number of times. The resulting point may then be used to stabilize the control system 10 as described above.

Similarly, calculating an initial active set may be computationally complex. Accordingly, to simplify the calculation, artificial simple bounds may be used. With a feasible point $x_0$, the active set may be initialized with n simple bounds as follows.

$$N = I_n, N_A = \{e_k, k = 1 \ldots n\} \tag{31}$$

where $e_k$ is k-th column of identity matrix

Thus, when $x_0(k) = x_{min}(k)$ the k-th constraint is k-th lower bound, when $x_0(k) = x_{max}(k)$ the k-th constraint is k-th upper bound, and when $x_{min}(k) < x_0(k) < x_{max}(k)$ the k-th constraint corresponds to an artificial bound $x_0(k) \le x(k) \le x_0(k)$. During the course of the primal active set solver, the artificial bounds may be deleted from the active set regardless of the sign of the corresponding dual variables. Combining the artificial simple bounds with the initial active set, $N = I_{n \times q}$ ($0 \le q \le n$). If q=n the full active set is used. If q=0 an empty active set is used. A good tradeoff may be k=[q/2].

Further efficiency enhancements may be made to the primal active set solver method. For example, rotations may be used to simplify an active set (i.e., constraints) matrix A. Specifically, factorization may be used to rotate the active set matrix when a constraint is added or deleted from active set. The described stable implementation is based on a modified Cholesky factorization of the Hessian matrix G where U is an upper triangular matrix.

$$G = UU^T \tag{32}$$

Thus, the modified Cholesky factorization may be computed using a standard Cholesky factorization and a permutation matrix P as follows.

$$PGP^T = L_2 L_2^T \tag{33}$$

$$G = UU^T, U = P^T L_2 P, P = \begin{bmatrix} & & \cdot^{\cdot^{\cdot}} \\ 0 & 0 & 1 \\ 0 & 1 & 0 \\ 1 & 0 & 0 \end{bmatrix}$$

As described in equation (33) the Hessian matrix is first permuted. Then the standard Cholesky factorization is calculated. Finally, the triangular matrix is permuted to get matrix U. Accordingly the following factorization of the matrix $U^{-1}N^+$, where $T^+$ is an upper triangular matrix, may be used.

$$(M^+)^T U^{-1} N^+ = \begin{bmatrix} T^+ \\ 0 \end{bmatrix} \tag{34}$$

$$(M^+)^T M^+ = D^{-1}$$

$$D = \text{diag}(d_1, d_2, \ldots d_n) = \begin{bmatrix} D_1 & 0 \\ 0 & D_2 \end{bmatrix} \begin{matrix} \}q \\ \}n-q \end{matrix}$$

Furthermore, the $J^+$ matrix may be calculated by the following equation.

$$J^+ = U^{-T} M^+ = [L^{-T} M_1^+ \quad L^{-T} M_2^+] = \begin{bmatrix} \underbrace{J_1^+}_{q} & \underbrace{J_2^+}_{n-q} \end{bmatrix} \tag{35}$$

The matrices J+, T+, D play a key role as they are may be used for the dynamic optimization calculation. The described factorization has advantage of upper triangularity of matrix $U^{-1}$. Thus when $N^+$ is composed of an initial part of an identity matrix the factorization is readily available.

As described above, plane rotations may be performed when a constraint is added or removed from the active set. For example, constraint p may be removed from the active set because the corresponding dual variable $u_p$ is negative. Furthermore, the following matrix structure is assumed.

$$N^+ = [N_1 n_p N_2], N = [N_1 N_2], \quad (36)$$

Matrix $N^+$ may first be reordered so that normal $n_p$ is moved to the last column as follows.

$$N_r^+ = [N_1 N_2 n_p] \quad (37)$$

Thus, the triangularity of the matrix $T^+$ may be affected as follows.

$$(J^+)^T N_r^+ = \begin{bmatrix} T_H^+ \\ 0 \end{bmatrix} \begin{matrix} \}q \\ \}n-q \end{matrix} = \begin{bmatrix} T_1 & S & t_{p1} \\ 0 & V & t_{p2} \\ 0 & 0 & 0 \end{bmatrix} \begin{matrix} \}p-1 \\ \}q-p+1 \\ \}n-q \end{matrix} \quad (38)$$

In order to restore its upper triangularity, a set of plane rotations Q may be applied to upper Hessenberg sub-matrix $[V\ t_{p2}]$ where $\gamma$ is scalar.

$$Q[V\ t_{p2}] = \begin{bmatrix} T_2 & d_1 \\ 0 & \gamma \end{bmatrix}, \quad (39)$$

$$T_r^+ = \begin{bmatrix} I & 0 \\ 0 & Q \end{bmatrix} T_H^+ = \begin{bmatrix} T_1 & S & d_1 \\ 0 & T_2 & \\ 0 & 0 & \gamma \end{bmatrix} = \begin{bmatrix} T & d_1 \\ 0 & \gamma \end{bmatrix}, d = \begin{bmatrix} d_1 \\ \gamma \end{bmatrix}$$

To nullify elements under the main diagonal, the rotations may be applied to matrix rows in the following order: (1,2), (2,3), ... (q-p, q-p+1). The same set of plane rotations Q may be applied to corresponding columns (p,p+1), ... (q-1,q) of matrix $J^+$ as follows.

$$J^+ = \begin{bmatrix} J_1^+ & J_2^+ \\ q & n-q \end{bmatrix} = \begin{bmatrix} J_{11}^+ & J_{12}^+ & J_2^+ \\ p & q-p & n-q \end{bmatrix} \quad (40)$$

$$J = \begin{bmatrix} J_{11}^+ & J_{12}^+ Q^T & J_2^+ \\ q & & n-q \end{bmatrix} = \begin{bmatrix} J_1 & J_2 \\ q-1 & n-q+1 \end{bmatrix}$$

Furthermore, utilizing the dual variable $u_p$ corresponding to active constraint $n_p$, may facilitate finding the optimum solution as follows.

$$z = -J(:,q+1)D(q+1,q+1)\gamma u_p \quad (41)$$

As used herein, z refers to a step toward the optimum solution in a primal space. In addition, the number constraints in the active set may be decremented as follows.

$$q = q-1 \quad (42)$$

Then, when a full step may be applied, the factorization for the reduced active set may be immediately available and the following updates may be made.

$$A^+ = A, N^+ = N, T^+ = T_r^+(1:q, 1:q), \quad (43)$$

$$J^+ = J = \begin{bmatrix} J_1^+ & J_2^+ \\ q & n-q \end{bmatrix}$$

Finally, equation (41) may be updated accordingly.

$$z = -J^+(:,q+1)D(q+1,q+1)T^+(q+1,q+1)u_p \quad (44)$$

On the other hand, constraints may also be added to the active set. For example, constraint $n_k$ may be added to active set as follows.

$$A_2 = AU\{k\}, N_2 = [N\ n_k], A^+ = A_2 U\{P\}, N^+ = [N_2\ n_p] \quad (45)$$

To update the matrix $T_r^+$, the last column d is shifted to the right and a new column h is put in its place as follows.

$$N^+[N\ n_k\ n_p] \quad (46)$$

$$u_p = (1-t)u_p$$

$$T_r^+ = [T_r^+(:, 1:q), h, d]$$

$$h = J^T n_k = \begin{bmatrix} h_1 \\ h_2 \end{bmatrix} \begin{matrix} \}q \\ \}n-q \end{matrix},$$

$$d = \begin{bmatrix} d_1 \\ d_2 \end{bmatrix} \begin{matrix} \}q \\ \}n-q \end{matrix}, d_2 = [\underbrace{\gamma\ 0\ \ldots\ 0}_{n-q}]^T$$

Similar to removing a constraint, for the new active set, a sequence of rotations Q may be applied to restore the triangularity. Based on the structure of the $T_r^+$, it may be sufficient to nullify all but the first element of the vector $h_2$. Specifically, the rotations may be applied in the planes (n-q, n-q-1), (n-q-1, n-q-2), ... (2, 1) as follows.

$$h_2 = \begin{bmatrix} x \\ x \\ x \\ x \end{bmatrix} \to \begin{bmatrix} x \\ x \\ y \\ 0 \end{bmatrix} \to \begin{bmatrix} x \\ z \\ 0 \\ 0 \end{bmatrix} \to \begin{bmatrix} \alpha \\ 0 \\ 0 \\ 0 \end{bmatrix} = \overline{h_2} \quad (47)$$

$$d_2 = \begin{bmatrix} x \\ 0 \\ 0 \\ 0 \end{bmatrix} \to \begin{bmatrix} x \\ 0 \\ 0 \\ 0 \end{bmatrix} \to \begin{bmatrix} x \\ 0 \\ 0 \\ 0 \end{bmatrix} \to \begin{bmatrix} a \\ b \\ 0 \\ 0 \end{bmatrix} = \overline{d_2}$$

After these rotations applied to $T_r^+$, the resulting triangular matrix is denotes as $T^+$. If fast rotations are applied then also corresponding diagonal elements of matrix D are updated. The same set of rotations may be applied to the columns of matrix $J^+$ as follows.

$$Qh_2 = \begin{bmatrix} \alpha \\ 0 \end{bmatrix} \}n-q = \overline{h_2},\ Qd_2 = \overline{d_2} \quad (48)$$

$$J = \begin{bmatrix} J_1^+ & J_2^+ Q^T \\ q & n-q \end{bmatrix}$$

After the above operations, the number of active constraints and notation of matrices may be updated as follows.

$$q = q+1, J^+ = J = \begin{bmatrix} J_1^+ & J_2^+ \\ q & n-q \end{bmatrix}, \quad (49)$$

Thus, equation (41) may be updated accordingly.

$$z = -J^+(:,q+1)D(q+1,q+1)T^+(q+1,q+1)u_p \quad (50)$$

Further improvements to the efficiency of the OBC 22, and more specifically the dynamic optimization 112, may be made by exploiting the structure of the optimization calculation. For example, computing the maximum step size. One part of calculating the maximum step size that may be computationally complex is evaluating constraints (i.e., computing scalar product $n^T z$). However, this calculation may be reduced by exploiting the special structure of the constraints. For example, constraints with simple bounds and corresponding slack may be evaluated as follows where $e_j$ is j-th column of identity matrix I).

$$n^T = e_j^T = \begin{bmatrix} 0...0 & \underset{j}{1} & 0...0 \end{bmatrix}^T \quad (51)$$

$$n^T z = z(j)$$

$$s_{min} = x(j) - x_{min}(j),$$

$$s_{max} = x_{max}(j) - x(j)$$

Similarly, delta constraints (R) may be efficiently evaluated as follows.

$$n^T = \Delta_j = \begin{bmatrix} 0...0 & \underset{j-1}{-1} & \underset{j}{1} & 0...0 \end{bmatrix}^T \quad (52)$$

$$n^T z = z(j) - z(j-1)$$

$$s_{min} = x(j) - x(j-1) - \Delta x_{min}, s_{max} = \Delta x_{max} - x(j) + x(j-1)$$

The structure of the optimization calculation may also be exploited to resolve degeneracy. As used herein, degeneracy refers to linearly dependent constraints in the active set. Accordingly, to avoid adding linearly dependent constraint, the step direction may be refined to reduce round-off errors. For example, if a simple bound constraint $e_k$ is active then corresponding element of step direction z(k) must be zero. Moreover, if a delta constraint $\Delta_k$ is active then z(k)=z(k−1). Similarly if neighboring delta constraints $\Delta_k$, $\Delta_{k+1}$ are active then z(k+1)=z(k)=z(k−1).

Specifically, a change of delta constraints may be as follows.

$$\text{Chain}_{ij} = \{\Delta_k; i \leq k \leq j, \Delta_k \in N_A, \Delta_{i-1} \notin N_A, \Delta_{j+1} \notin N_A\} \quad (53)$$

An example of active constraints corresponding to a chain is below.

$$N = \begin{bmatrix} -1 & 0 & 0 & 0 \\ 1 & -1 & 0 & 0 \\ 0 & 1 & -1 & 0 \\ 0 & 0 & 1 & 0 \end{bmatrix} \quad (54)$$

If there is also active simple bound with index inside a chain then the fixed chain may be defined as follows.

$$\text{FixedChain}_{ij} = \{\Delta_k; \Delta_k \in \text{Chain}_{ij}, \exists r : i-1 \leq r \leq j, e_r \in N_A\} \quad (55)$$

An example of active constraints corresponding to a fixed chain is below.

$$N = \begin{bmatrix} -1 & 0 & 0 & 0 \\ 1 & -1 & 1 & 0 \\ 0 & 1 & 0 & 0 \\ 0 & 0 & 0 & 0 \end{bmatrix} \quad (56)$$

Based on these definitions a refine function (Ref) may be defined as follows.

$$z_r = \text{Ref}(z): \quad (57)$$

$$z_r(i) = \begin{cases} 0 & e_i \in N_A \\ 0 & \Delta_i \in \text{FixedChain} \\ 0 & \Delta_{i+1} \in \text{FixedChain} \\ z(i-1) & \Delta_i \in \text{Chain} \\ z(i) & \text{Otherwise} \end{cases}$$

Thus, the Ref function may prevent adding linearly dependent constraints and so resolve degeneracy.

The structure of the optimization calculation may still further be exploited to calculate the dual variables. Based on the structure of the constraints, the dual variables may calculated directly from the definition. As used herein, a dual variable u corresponds to an active constraint n may be denoted as $u_d(n)$. If a simple constraint $e_k$ is active and neither $\Delta_k$ nor $\Delta_{k+1}$ are active then corresponding dual variable is $u_d(e_k)=g_k$. If a delta constraint $\Delta_k$ is active and neither $\Delta_{k-1}$ nor $e_{k-1}$ are active then we can put $u_d(\Delta_k)=-g_{k-1}$. If a chain of delta constraints $\text{Chain}_{ij}$ is active then calculate dual variables for delta constraints i ... j. This may be accomplished through various methods. For example, the dual variables may be calculated using the following equation.

$$u_d(\Delta_i) = -g_{i-1} \quad (58)$$

$$u_d(\Delta_{i+1}) = u_d(\Delta_i) - g_i$$

$$u_d(\Delta_{i+2}) = u_d(\Delta_{i+1}) - g_{i+1}$$

$$\vdots$$

$$u_d(\Delta_j) = u_d(\Delta_{j-1}) - g_{j-1}$$

Alternatively, the dual variables may be calculated using the following equation.

$$u_d(\Delta_j) = g_j \quad (59)$$

$$u_d(\Delta_{j-1}) = u_d(\Delta_j) + g_{j-1}$$

$$u_d(\Delta_{j-2}) = u_d(\Delta_{j-1}) - g_{j-2}$$

$$\vdots$$

$$u_d(\Delta_i) = u_d(\Delta_{i+1}) - g_i$$

Or, the dual variables calculated in equation (58) and equation (59) may be averaged. Similarly, various methods may be used when a chain of fixed delta constraints FixedChain$_{ijr}$ is active. For example, the dual variables may be calculated for delta constraints i . . . r using equation (58). Alternatively, the dual variables may be calculated for delta constraints r+1 . . . j using equation (59). Furthermore, the dual variables may be calculated for e$_r$: u$_d$(e$_r$)=g$_r$+u$_d$(Δ$_{r+1}$)−u$_d$(Δ$_r$).

As seen in equation (58) and equation (59), the dual variable calculation may utilize gradients. Instead of calculating the absolute value of the gradient it may be more efficient to update it in every step as follows.

$$\Delta g = G\Delta x = \sum_{i=1}^{n} G(:,i)\Delta x(i), \quad (60)$$

$$\Delta x = tz$$

It follows from the structure of the constraints that if simple bound e$_k$ is active then corresponding element Δx(k)=0. Similarly, if a fixed chain FixedChain$_{ijr}$ is active then corresponding elements Δx(k)=0, k=i . . . j. Furthermore, if a Chain$_{ij}$ is active then Δx(k)=Δx(i), k=i . . . j. Thus, multiplication operations may be saved as follows.

$$\sum_{k=i}^{j} G(:,k)\Delta x(k) = \Delta x(i)\sum_{k=i}^{j} G(:,k) \quad (61)$$

As such, the computation of dual variable may be accomplished with only elements k of the gradient that correspond to a simple bound e$_k$ or a chain Chain$_{ij}$ or a fixed chain FixedChain$_{ijr}$ with i≤k≤j, which may save other operations. A set of indices of gradient may be updated. If a new constraint is added to the active set, then the corresponding absolute element of the gradient g(k) may be calculated and the next steps we just update it through Δg(k).

In case of adding simple bound e$_k$, the vector h is simply k-th column of the matrix J$^T$.

$$J^T e_k = J^T(:,k) = h = \begin{bmatrix} h_1 \\ h_2 \end{bmatrix} \begin{matrix} \}q \\ \}n-q \end{matrix} \quad (62)$$

In case of adding delta constraint Δ$_k$, the vector h may simply be the difference of the k-th and (k−1)-th columns of the matrix J$^T$.

$$J^T \Delta_k = J^T(:,k) - J^T(:,k-1) = h = \begin{bmatrix} h_1 \\ h_2 \end{bmatrix} \begin{matrix} \}q \\ \}n-q \end{matrix} \quad (63)$$

The matrix J=U$^{-T}$ is initially lower triangular. For every column J(:,k) of the matrix J an integer number (o$_k$) that corresponds to a number of zeros in the initial part of the vector may be store and maintain. In other words, J(i,k)=0 for i=1 . . . o$_k$. Plane rotation may then be applied to two neighboring columns J(:,k) and J(:,k+1) as follows.

$$[J(:,k) \quad J(:,k+1)]Q^T = o_k \begin{bmatrix} 1 & \begin{bmatrix} 0 & 0 \\ \vdots & \vdots \\ 0 & 0 \\ x & 0 \\ x & x \end{bmatrix} \end{bmatrix} Q^T = \begin{bmatrix} 0 & 0 \\ \vdots & \vdots \\ 0 & 0 \\ y & y \\ y & y \end{bmatrix} \quad (64)$$

It should be appreciated that o$_k$+1 . . . n may be rotated. After the rotation, the integer o$_{k+1}$ may be incremented.

Furthermore, it may also possible to take advantage of the special sparse structure of the matrix J in the procedure of adding constraint. For example, when adding simple bound e$_k$ or delta constraint Δ$_k$ there is good chance, in the early stages of the optimization calculation, that m last elements of the vector h$_2$ are zeros. For each column of the matrix J a variable that stores the number of zeros in the initial part of the column may be defined. When two columns are rotated these numbers are used to calculate an initial index from which to start rotations. Accordingly unnecessary operations may be avoided.

Generally, the above techniques enable deterministic optimization control to be used with plants/process 12 with fast dynamics. More specifically, the OBC 22 is configured to provide a stable feasible control trajectory during each control time, which may include comparing the cost of feasible solutions (i.e., control trajectory) to the cost of previous solutions. Furthermore, techniques are described herein to improve the efficiency of the OBC 22 by simplifying complex calculations, such as dynamic optimization.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A control system, comprising:
a controller that, in operation, controls operation an industrial process;
the controller being configured to, in operation, perform the following steps:
determining, using a control system, a first feasible control trajectory comprising a first control action to implement in the process during a first future time step and a second control action to implement in the industrial process during a second future time step after the first future time step;
determining, using the control system, a second feasible control trajectory comprising the second control action by time shifting the first feasible control trajectory from the first future time step to the second future time step;
determining, using the control system, a third feasible control trajectory comprising a third control action to implement in the industrial process during the second future time stamp by performing a first optimization search based at least in part on state of the industrial process and constraints on operation of the industrial process;
determining, using the control system, a first cost associated with implementing the second control action during the second future time step based at least in part on an objective function;
determining, using the control system, a second cost associated with implementing the third control action during the second future time step based at least in part on the objective function; and controlling, using the control system, the operation of the industrial process by instructing the industrial process to implement the second control action or the third control action based at least in part on the first cost and the second cost.

2. The system of claim 1, wherein the controller is configured to, in operation, perform the following steps:
determining the first feasible control trajectory comprises performing a second optimization search based at least in part on state of the industrial process and constraints on operation of the industrial process during the first time step; and
determining the second feasible control trajectory comprises performing the first optimization search based at least in part on the state of the industrial process and the constraints on operation of the industrial process during the second time.

3. The system of claim 2, wherein the first optimization search-comprises a feasible optimization search, the second optimization search comprises the feasible optimization search, or both.

4. The system of claim 3, wherein the feasible optimization search comprises a primal active set solver.

5. The system of claim 1, wherein the first feasible control trajectory comprises a shifted and padded version of the control trajectory used during the first time step.

6. The system of claim 1, wherein the controller is configured to, in operation, determine the first feasible control trajectory and the second feasible control trajectory during operation of the industrial process.

7. The system of claim 1, wherein determining the second feasible control trajectory comprises:
determining an infeasible control trajectory during an allotted amount of time, wherein the infeasible control trajectory does not satisfy constraints on the operation of the industrial process; and
mapping the infeasible control trajectory to the second feasible control trajectory, wherein the second feasible control trajectory satisfies the constraints on the operation of the industrial process.

8. The system of claim 1, wherein determining the second feasible control trajectory comprises:
performing the first optimization search based at least in part on a non-linear model configured to model operation of the industrial process; and
determining the second feasible control trajectory based at least in part on results from the optimization search to ensure that the second feasible control trajectory satisfies each constraint on the operation of the industrial process.

9. A method of controlling operation of an industrial process, comprising:
determining, using a control system, a first feasible control trajectory comprising a first control action to implement in the industrial process during a first future time step and a second control action to implement in the industrial process during a second future time step after the first future time step;
determining, using the control system, a second feasible control trajectory comprising the second control action by time shifting the first feasible control trajectory from the first future time step to the second future time step;
determining, using the control system, a third feasible control trajectory comprising a third control action to implement in the industrial process during the second future time stamp by performing a first optimization search based at least in part on state of the industrial process and constraints on operation of the industrial process;
determining, using the control system, a first cost associated with implementing the second control action during the second future time step based at least in part on an objective function;
determining, using the control system, a second cost associated with implementing the third control action during the second future time step based at least in part on the objective function; and
controlling, using the control system, the operation of the industrial process by instructing the industrial process to implement the second control action or the third control action based at least in part on the first cost and the second cost.

10. The method of claim 9, wherein determining the first feasible control trajectory comprises performing a second optimization search based at least in part on the state of the industrial process and the constraints on operation of the industrial process during the first future time step.

11. The method of claim 9, wherein performing the first optimization search comprises:
determining a feasible region based at least in part on the constraints on the operation of the industrial process;
determining a cost associated with a plurality of points within the feasible region based at least in part on the objective function; and
selecting one point from the plurality of points based at least in part on associated costs, wherein the one point comprises the third feasible control trajectory.

12. The method of claim 9, wherein:
determining the second feasible control trajectory comprises padding the first feasible control trajectory by adding a fourth control action to be implemented in the industrial process during a third future time step after the second future time step; and
the third feasible control trajectory comprises a fifth control action to be implemented in the industrial process during the third future time step.

13. The method of claim 9, wherein controlling the operation of the industrial process comprises:
instructing the industrial process to implement the second control action when the first cost is less than the second cost; and
instructing the industrial process to implement the third control action when the second cost is less than the first cost.

14. The method of claim 9, wherein performing the first optimization search comprises:
determining a feasible region and an infeasible region based at least in part on the constraints on the operation of the industrial process;
determining a cost associated with a plurality of points within the feasible region and the infeasible region based at least in part on the objective function;
selecting a first point from the plurality of points based at least in part on associated costs, wherein the first point comprises the third feasible control trajectory when within the feasible region; and
mapping the first point to a second point in the feasible region when the first point is within the infeasible region, wherein the second point comprises the third feasible control trajectory.

15. The method of claim 9, wherein:
determining the second feasible control trajectory comprises determining the second feasible trajectory during operation of the industrial process; and determining the third feasible control trajectory comprises determining the third feasible trajectory during operation of the industrial process.

16. A tangible, non-transitory, computer-readable medium configured to store instructions executable by one or more processors of a control system, wherein the instructions comprise instructions to:
- determine, using a control system, a first feasible control trajectory comprising a first control action to implement in the process during a first future time step and a second control action to implement in the industrial process during a second future time step after the first future time step;
- determine, using the control system, a second feasible control trajectory comprising the second control action by time shifting the first feasible control trajectory from the first future time step to the second future time step;
- determine, using the control system, a third feasible control trajectory comprising a third control action to implement in the industrial process during the second future time stamp by performing a first optimization search based at least in part on state of the industrial process and constraints on operation of the industrial process;
- determine, using the control system, a first cost associated with implementing the second control action during the second future time step based at least in part on an objective function;
- determine, using the control system, a second cost associated with implementing the third control action during the second future time step based at least in part on the objective function; and
- control, using the control system, the operation of the industrial process by instructing the industrial process to implement the second control action or the third control action based at least in part on the first cost and the second cost.

17. The computer-readable medium of claim 16, wherein determining the first feasible control trajectory comprises performing a second optimization search based at least in part on the state of the industrial process and the constraints on operation of the industrial process during the first future time step.

18. The computer-readable medium of claim 16, wherein performing the first optimization search comprises:
- determining a feasible region based at least in part on the constraints on the operation of the industrial process;
- determining a cost associated with a plurality of points within the feasible region based at least in part on the objective function; and
- selecting one point from the plurality of points based at least in part on associated costs, wherein the one point comprises the third feasible control trajectory.

19. The computer-readable medium of claim 16, wherein determining the second feasible control trajectory comprises padding the first feasible control trajectory by adding a fourth control action to be implemented in the industrial process during a third future time step after the second future time step; and
- the third feasible control trajectory comprises a fifth control action to be implemented in the industrial process during the third future time step.

20. The computer-readable medium of claim 16, wherein controlling the operation of the industrial process comprises:
- instructing the industrial process to implement the second control action when the first cost is less than the second cost; and
- instructing the industrial process to implement the third control action when the second cost is less than the first cost.

* * * * *